US012639443B2

(12) United States Patent
Lopez et al.

(10) Patent No.: US 12,639,443 B2
(45) Date of Patent: May 26, 2026

(54) SOFTWARE UPDATING DEVICE

(71) Applicant: HITACHI ASTEMO, LTD.,
Hitachinaka (JP)

(72) Inventors: Jairo Lopez, Tokyo (JP); Hidetoshi Teraoka, Tokyo (JP); Yuki Horita, Tokyo (JP); Mikio Kataoka, Tokyo (JP)

(73) Assignee: HITACHI ASTEMO, LTD.,
Hitachinaka (JP)

( * ) Notice: Subject to any disclaimer, the term of this patent is extended or adjusted under 35 U.S.C. 154(b) by 153 days.

(21) Appl. No.: 18/726,852

(22) PCT Filed: Aug. 15, 2022

(86) PCT No.: PCT/JP2022/030890
§ 371 (c)(1),
(2) Date: Jul. 5, 2024

(87) PCT Pub. No.: WO2023/139821
PCT Pub. Date: Jul. 27, 2023

(65) Prior Publication Data
US 2025/0094596 A1      Mar. 20, 2025

(30) Foreign Application Priority Data
Jan. 21, 2022      (JP) ................................. 2022-007795

(51) Int. Cl.
| *G06F 21/00* | (2013.01) |
| *G06F 21/54* | (2013.01) |
| *G06F 21/57* | (2013.01) |

(52) U.S. Cl.
CPC ............ *G06F 21/572* (2013.01); *G06F 21/54* (2013.01)

(58) Field of Classification Search
CPC ............................... G06F 21/54; G06F 21/572
(Continued)

(56) References Cited

U.S. PATENT DOCUMENTS

| 2021/0155252 A1 | 5/2021 | Harata et al. | |
| 2022/0284743 A1* | 9/2022 | Yoshimi | .............. G06F 16/2358 |
| 2023/0005305 A1* | 1/2023 | Sakurai | ..................... G06F 8/65 |

FOREIGN PATENT DOCUMENTS

| CN | 112559000 A | * | 3/2021 | ............... G06F 8/65 |
| DE | 102013108021 A1 | * | 3/2014 | ............... G06F 8/65 |
(Continued)

OTHER PUBLICATIONS

International Search Report with English Translation and Written Opinion of International Patent Application No. PCT/JP2022/030890 dated Nov. 1, 2022 (11 pages).

*Primary Examiner* — Josnel Jeudy
(74) *Attorney, Agent, or Firm* — Foley & Lardner LLP

(57) ABSTRACT

The present invention makes it possible to identify software that is safe and determines what software can be rolled back while maintaining a high level of safety and security. A software updating device E1000 includes: software unit storage E1520 that stores a plurality of software units UX000 that include label information UX400; and an update control unit E1400 that controls software updates for a vehicular control device ECU_EX000. The label information UX400 includes at least safety-related information for the software units UX000. Upon receiving a rollback command, the update control unit E1400 selects software from the plurality of software units UX000 that has safety-related label information UX400 that is identical to safety-related label information UX400 of software installed at the vehicular control device as software to roll back.

6 Claims, 20 Drawing Sheets

(58) Field of Classification Search
USPC ........................................................... 726/22
See application file for complete search history.

(56) References Cited

FOREIGN PATENT DOCUMENTS

| | | | | | |
|---|---|---|---|---|---|
| DE | 112020004011 | T | * | 5/2022 | ............... G06F 8/65 |
| DE | 112020004017 | T5 | * | 5/2022 | ............... G06F 8/65 |
| JP | 2020-027630 | A | | 2/2020 | |
| JP | 2020027652 | A | * | 2/2020 | ............. G06F 8/658 |

* cited by examiner

FIG. 11

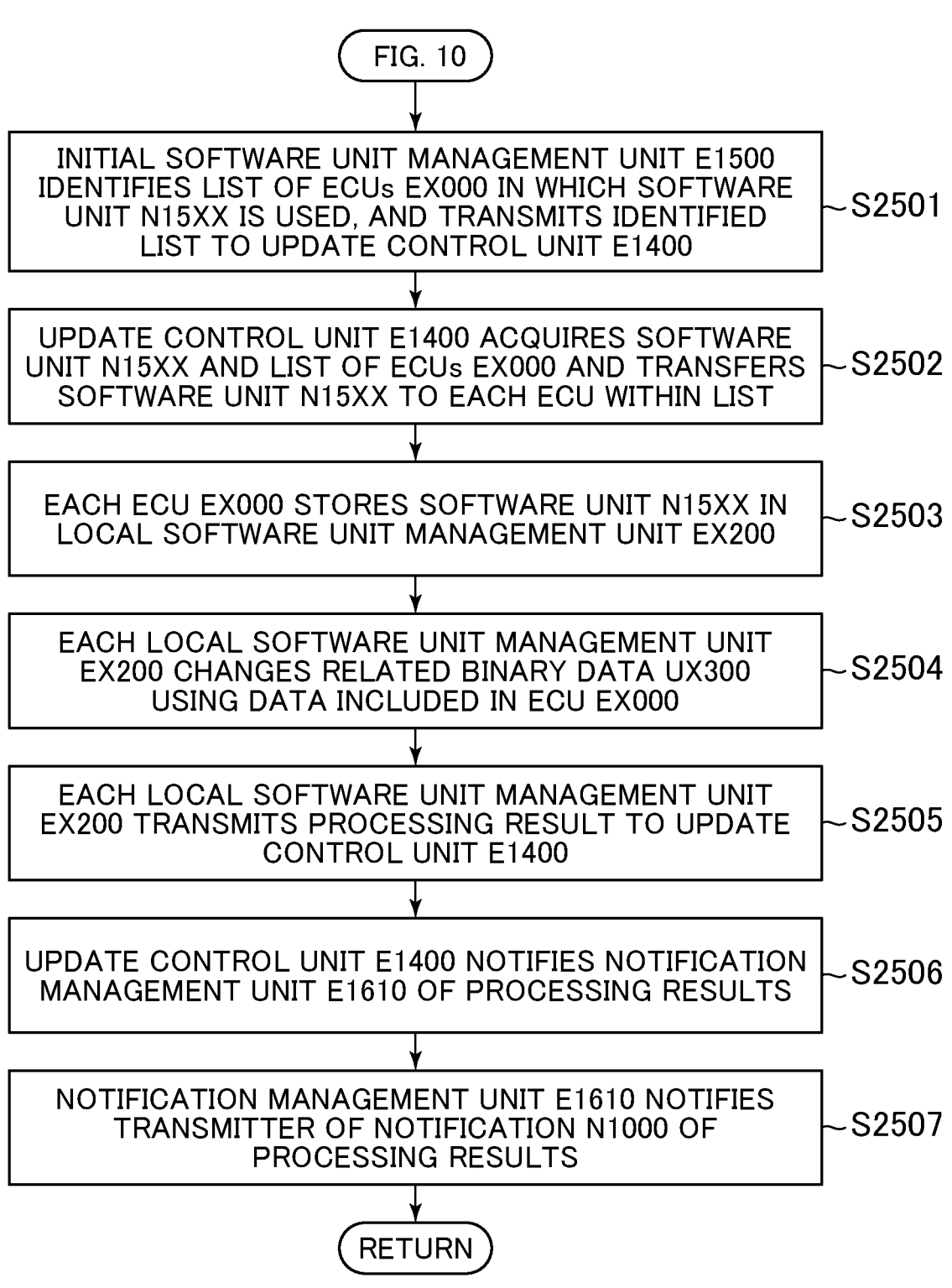

FIG. 10

INITIAL SOFTWARE UNIT MANAGEMENT UNIT E1500 IDENTIFIES LIST OF ECUs EX000 IN WHICH SOFTWARE UNIT N15XX IS USED, AND TRANSMITS IDENTIFIED LIST TO UPDATE CONTROL UNIT E1400 — S2501

UPDATE CONTROL UNIT E1400 ACQUIRES SOFTWARE UNIT N15XX AND LIST OF ECUs EX000 AND TRANSFERS SOFTWARE UNIT N15XX TO EACH ECU WITHIN LIST — S2502

EACH ECU EX000 STORES SOFTWARE UNIT N15XX IN LOCAL SOFTWARE UNIT MANAGEMENT UNIT EX200 — S2503

EACH LOCAL SOFTWARE UNIT MANAGEMENT UNIT EX200 CHANGES RELATED BINARY DATA UX300 USING DATA INCLUDED IN ECU EX000 — S2504

EACH LOCAL SOFTWARE UNIT MANAGEMENT UNIT EX200 TRANSMITS PROCESSING RESULT TO UPDATE CONTROL UNIT E1400 — S2505

UPDATE CONTROL UNIT E1400 NOTIFIES NOTIFICATION MANAGEMENT UNIT E1610 OF PROCESSING RESULTS — S2506

NOTIFICATION MANAGEMENT UNIT E1610 NOTIFIES TRANSMITTER OF NOTIFICATION N1000 OF PROCESSING RESULTS — S2507

RETURN

FIG. 15

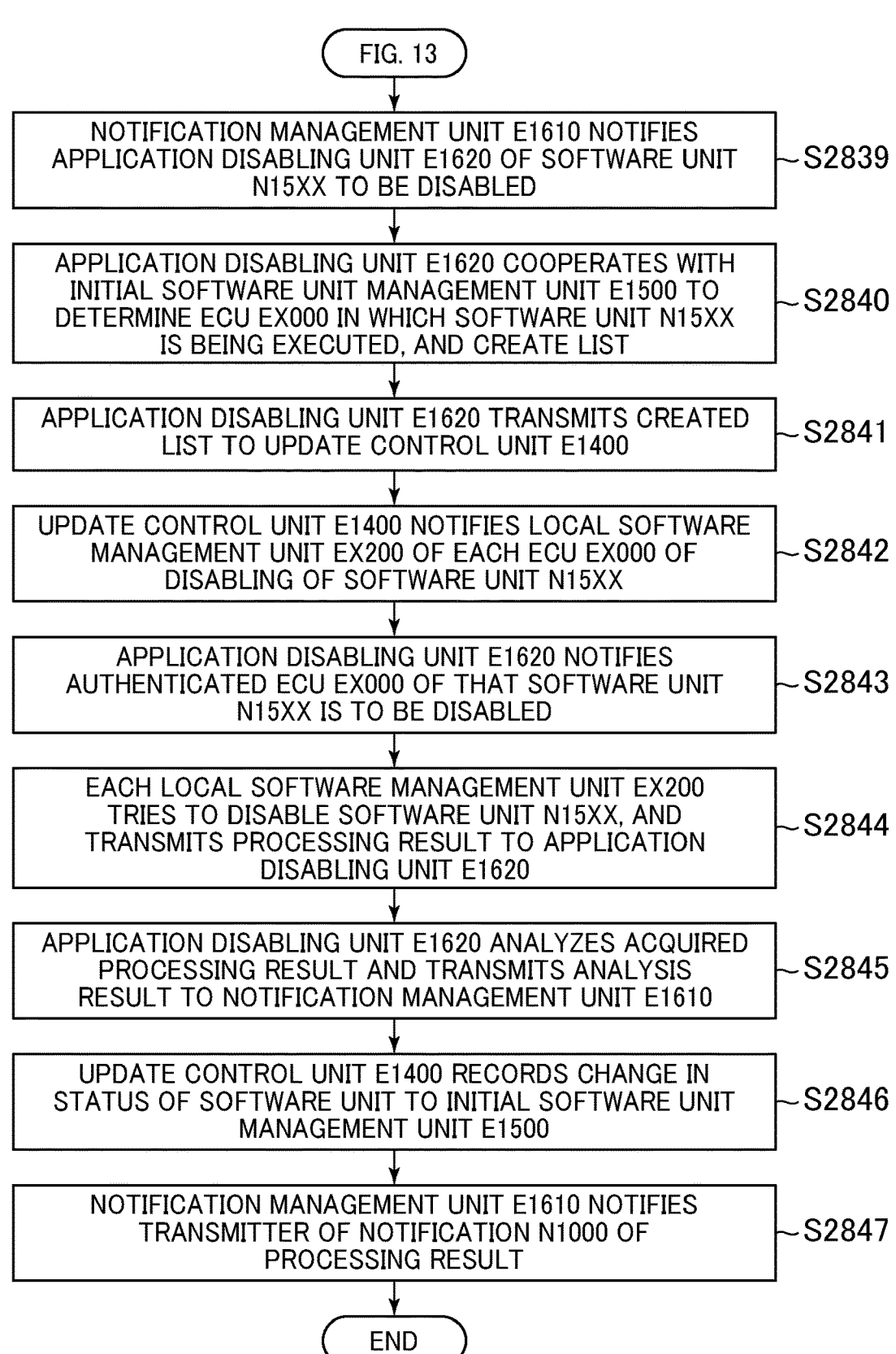

FIG. 13

NOTIFICATION MANAGEMENT UNIT E1610 NOTIFIES APPLICATION DISABLING UNIT E1620 OF SOFTWARE UNIT N15XX TO BE DISABLED — S2839

APPLICATION DISABLING UNIT E1620 COOPERATES WITH INITIAL SOFTWARE UNIT MANAGEMENT UNIT E1500 TO DETERMINE ECU EX000 IN WHICH SOFTWARE UNIT N15XX IS BEING EXECUTED, AND CREATE LIST — S2840

APPLICATION DISABLING UNIT E1620 TRANSMITS CREATED LIST TO UPDATE CONTROL UNIT E1400 — S2841

UPDATE CONTROL UNIT E1400 NOTIFIES LOCAL SOFTWARE MANAGEMENT UNIT EX200 OF EACH ECU EX000 OF DISABLING OF SOFTWARE UNIT N15XX — S2842

APPLICATION DISABLING UNIT E1620 NOTIFIES AUTHENTICATED ECU EX000 OF THAT SOFTWARE UNIT N15XX IS TO BE DISABLED — S2843

EACH LOCAL SOFTWARE MANAGEMENT UNIT EX200 TRIES TO DISABLE SOFTWARE UNIT N15XX, AND TRANSMITS PROCESSING RESULT TO APPLICATION DISABLING UNIT E1620 — S2844

APPLICATION DISABLING UNIT E1620 ANALYZES ACQUIRED PROCESSING RESULT AND TRANSMITS ANALYSIS RESULT TO NOTIFICATION MANAGEMENT UNIT E1610 — S2845

UPDATE CONTROL UNIT E1400 RECORDS CHANGE IN STATUS OF SOFTWARE UNIT TO INITIAL SOFTWARE UNIT MANAGEMENT UNIT E1500 — S2846

NOTIFICATION MANAGEMENT UNIT E1610 NOTIFIES TRANSMITTER OF NOTIFICATION N1000 OF PROCESSING RESULT — S2847

END

FIG. 16

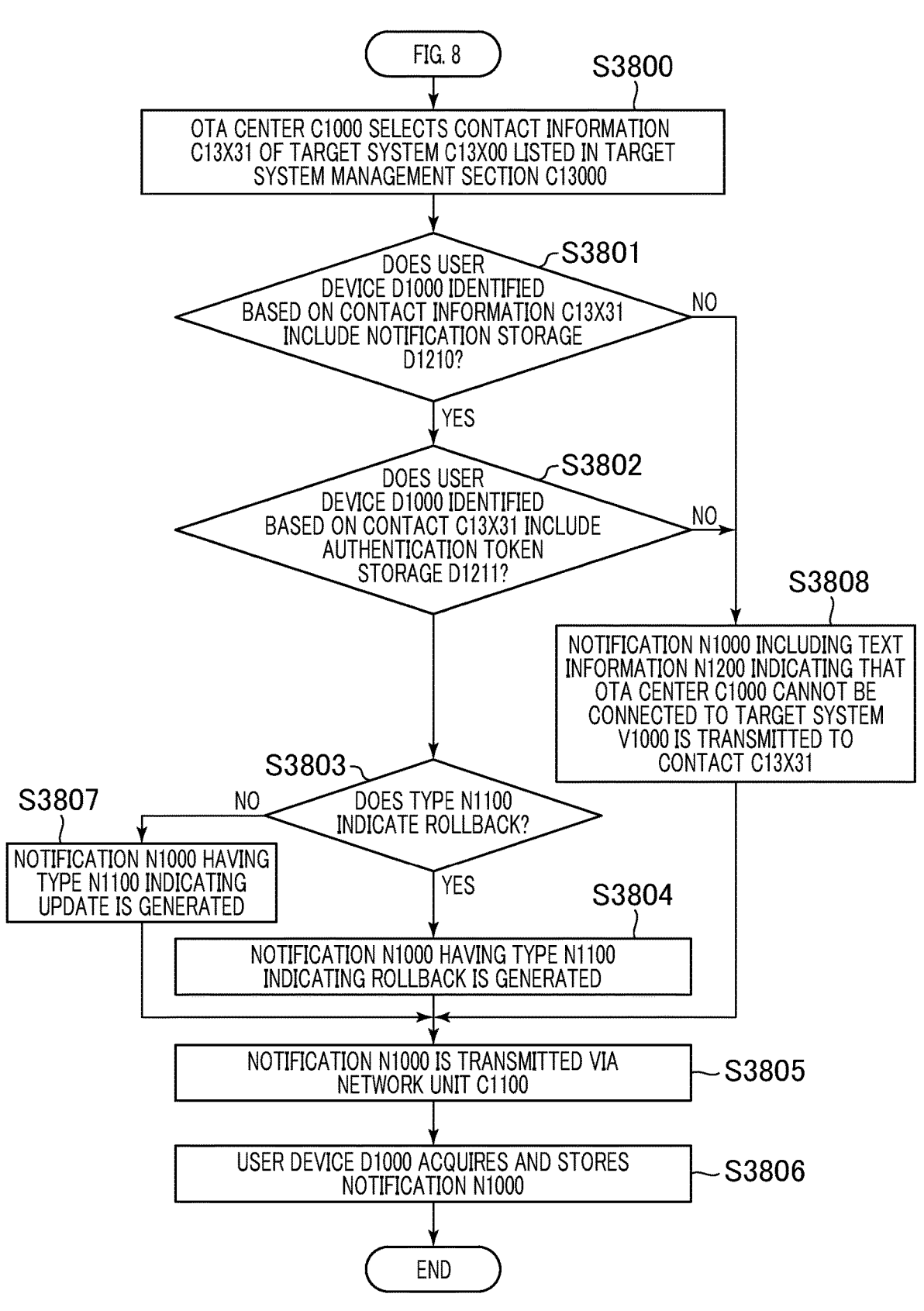

OTA CENTER C1000 SELECTS CONTACT INFORMATION C13X31 OF TARGET SYSTEM C13X00 LISTED IN TARGET SYSTEM MANAGEMENT SECTION C13000

S3801

DOES USER DEVICE D1000 IDENTIFIED BASED ON CONTACT INFORMATION C13X31 INCLUDE NOTIFICATION STORAGE D1210?

NO

YES

S3802

DOES USER DEVICE D1000 IDENTIFIED BASED ON CONTACT C13X31 INCLUDE AUTHENTICATION TOKEN STORAGE D1211?

NO

S3808

NOTIFICATION N1000 INCLUDING TEXT INFORMATION N1200 INDICATING THAT OTA CENTER C1000 CANNOT BE CONNECTED TO TARGET SYSTEM V1000 IS TRANSMITTED TO CONTACT C13X31

S3807

S3803

NO

DOES TYPE N1100 INDICATE ROLLBACK?

NOTIFICATION N1000 HAVING TYPE N1100 INDICATING UPDATE IS GENERATED

YES

S3804

NOTIFICATION N1000 HAVING TYPE N1100 INDICATING ROLLBACK IS GENERATED

NOTIFICATION N1000 IS TRANSMITTED VIA NETWORK UNIT C1100

S3805

USER DEVICE D1000 ACQUIRES AND STORES NOTIFICATION N1000

S3806

END

FIG. 18

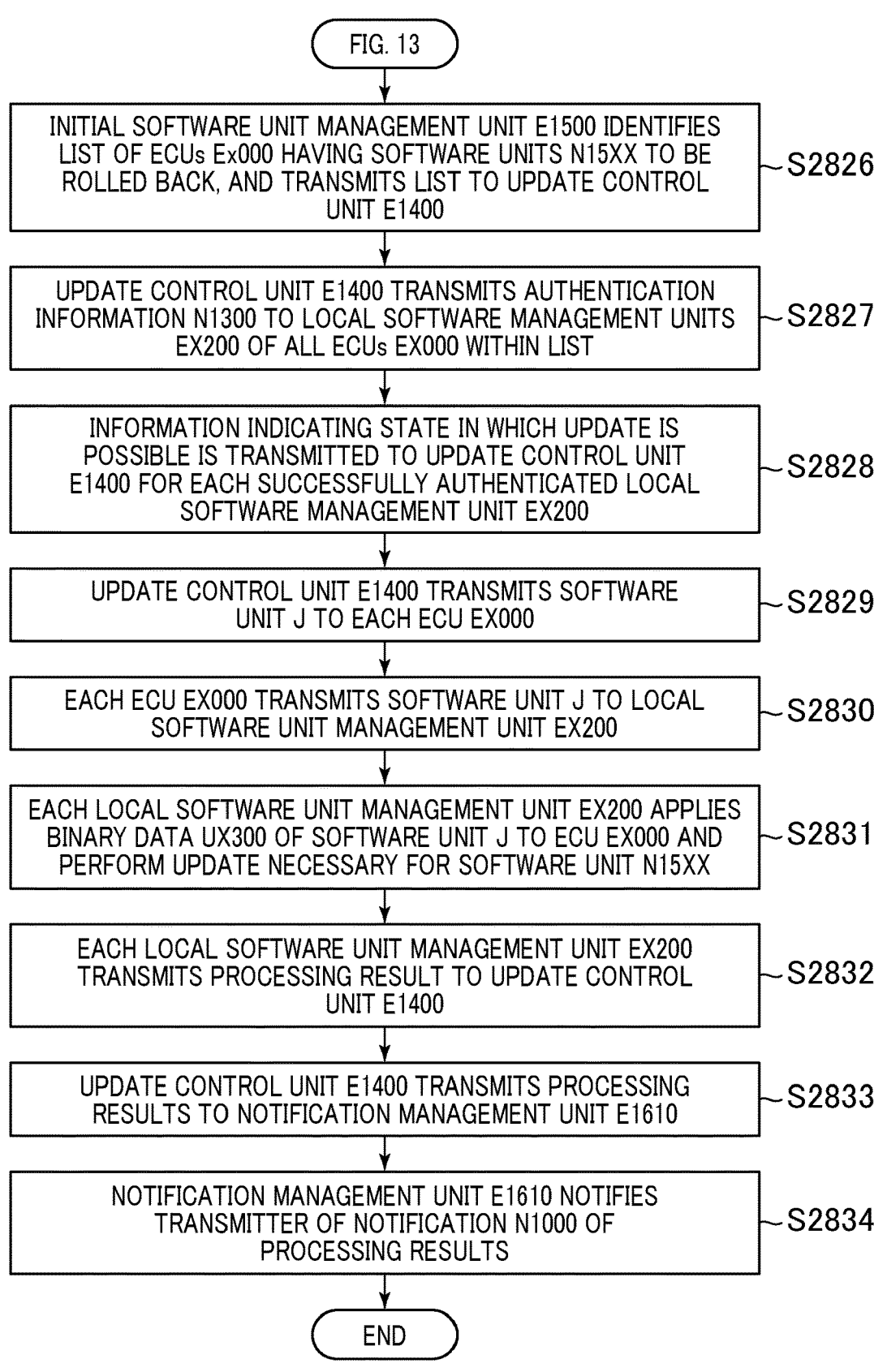

FIG. 13

INITIAL SOFTWARE UNIT MANAGEMENT UNIT E1500 IDENTIFIES LIST OF ECUs Ex000 HAVING SOFTWARE UNITS N15XX TO BE ROLLED BACK, AND TRANSMITS LIST TO UPDATE CONTROL UNIT E1400 — S2826

UPDATE CONTROL UNIT E1400 TRANSMITS AUTHENTICATION INFORMATION N1300 TO LOCAL SOFTWARE MANAGEMENT UNITS EX200 OF ALL ECUs EX000 WITHIN LIST — S2827

INFORMATION INDICATING STATE IN WHICH UPDATE IS POSSIBLE IS TRANSMITTED TO UPDATE CONTROL UNIT E1400 FOR EACH SUCCESSFULLY AUTHENTICATED LOCAL SOFTWARE MANAGEMENT UNIT EX200 — S2828

UPDATE CONTROL UNIT E1400 TRANSMITS SOFTWARE UNIT J TO EACH ECU EX000 — S2829

EACH ECU EX000 TRANSMITS SOFTWARE UNIT J TO LOCAL SOFTWARE UNIT MANAGEMENT UNIT EX200 — S2830

EACH LOCAL SOFTWARE UNIT MANAGEMENT UNIT EX200 APPLIES BINARY DATA UX300 OF SOFTWARE UNIT J TO ECU EX000 AND PERFORM UPDATE NECESSARY FOR SOFTWARE UNIT N15XX — S2831

EACH LOCAL SOFTWARE UNIT MANAGEMENT UNIT EX200 TRANSMITS PROCESSING RESULT TO UPDATE CONTROL UNIT E1400 — S2832

UPDATE CONTROL UNIT E1400 TRANSMITS PROCESSING RESULTS TO NOTIFICATION MANAGEMENT UNIT E1610 — S2833

NOTIFICATION MANAGEMENT UNIT E1610 NOTIFIES TRANSMITTER OF NOTIFICATION N1000 OF PROCESSING RESULTS — S2834

END

SOFTWARE UPDATING DEVICE

TECHNICAL FIELD

The present invention relates to a technique for enabling safe and reliable rollback on a software unit of a target system and maintaining highest levels of safety and security with the highest possible level of operability.

BACKGROUND ART

With the development of techniques for autonomous driving, reliable functional safety is required, especially in terms of vehicular control. The development of software for ensuring reliable functional safety is progressing, and updates are becoming more frequent. In the automotive field, in recent years, the development of software-based functions, such as Adaptive Cruise Control (ACC), Automatic Emergency Steering (AES), Advanced Driver Assistance System (ADAS), and Autonomous Driving (AD), is progressing. In addition to complex functions such as ACC and AES, low-end vehicles are provided with less complex software-based electronic stability control (ESC) and backup cameras. In these vehicles, 100 electronic control units (ECUs) are integrated with 100 million lines of code, many software-compatible functions are introduced to users.

In many fields of functional safety, safety requirements are almost established and can be easily tested even as software becomes more complex. However, software-related errors are discovered after products have been sold and corrected each time. In the automotive field, software-related errors directly affect main functions of many vehicles, suspend services of vehicle suppliers, and degrade the quality of user experience. In this regard, half of vehicle recalls in 2019 were related to software-based defects.

The rise of ubiquitous connectivity via the 4G and 5G mobile phone technology, and the increasing use of higher bandwidth Internet in many homes, has enabled software updates via Firmware Over the Air (FOTA) and Software Over the Air (SOTA). These update mechanisms have allowed product manufacturers to update software without having to ship products back to the manufacturers. When a user uses the FOTA/SOTA techniques, the user can simply connect to the Internet to acquire the latest functions and acquire the latest update information for keeping their vehicles functioning properly. Particularly, in the automotive field, updating and sorting software has traditionally required users to move to a specific location, such as a dealership, and has been performed at the specific location. This was a logistical burden for the manufacturers and was a consideration for consumers as well.

Even when the FOTA/SOTA techniques are used, a software-related error may occur at the time of updating devices with complex software implemented therein. In such a case, due to the complexity of software to be updated, it may take several weeks for a problem to be resolved. Particularly, in the automotive field, in a case where a device to be updated is a vehicle regulated by a government agency, authentication and a permission are required to perform the update, which requires additional time for an end user to complete the update. That is, in a case where a reliable correction is desired, there is a possibility that the vehicle in which the error has occurred will be unable to be used for a long period of time.

Another solution in this case may be to disable the software that is considered as the cause of the problem until a fixing patch is distributed to fix the error. However, disabling the software may cause safety and security problems for the vehicle.

The above-described two methods are extremes, and it is desired to develop an intermediate solution between the methods.

CITATION LIST

Patent Literature

Patent Literature 1: Japanese Unexamined Patent Application Publication No. 2020-027630

SUMMARY OF INVENTION

Technical Problem

In view of the above-described problems, an object of the present invention is to provide a method of quickly changing all software on a target system to other software considered to be safe while maintaining a software function as much as possible.

Solution to Problem

In order to solve the above-described problems, a software updating device according to the present invention includes software storage that stores a plurality of software units including label information; and a software update control unit that controls a software update of a vehicular control device. The label information includes at least safety-related information for the software units. Upon receiving a rollback command, the software update control unit selects, as a software unit to be rolled back from among the plurality of software units, a software unit having safety-related label information identical to safety-related label information of a software unit installed in the vehicular control device.

Advantageous Effects of Invention

According to the present invention, it is possible to identify safe software and determine software that can be used for rollback while maintaining high safety and security standards.

Other features regarding the present invention will be clarified from the description of this specification and the drawings. In addition, problems, configurations, and effects other than those described above will be clarified from the following description of embodiments.

BRIEF DESCRIPTION OF DRAWINGS

FIG. 11 is a flowchart illustrating a process of changing a software unit.

FIG. 15 is a flowchart illustrating a process of disabling a software unit in the target system.

FIG. 16 is a flowchart illustrating a process of transmitting a notification by the OTA center to the user device.

FIG. 18 is a flowchart illustrating a process of rolling back or replacing a software unit.

DESCRIPTION OF EMBODIMENTS

First Embodiment

Figure 1:
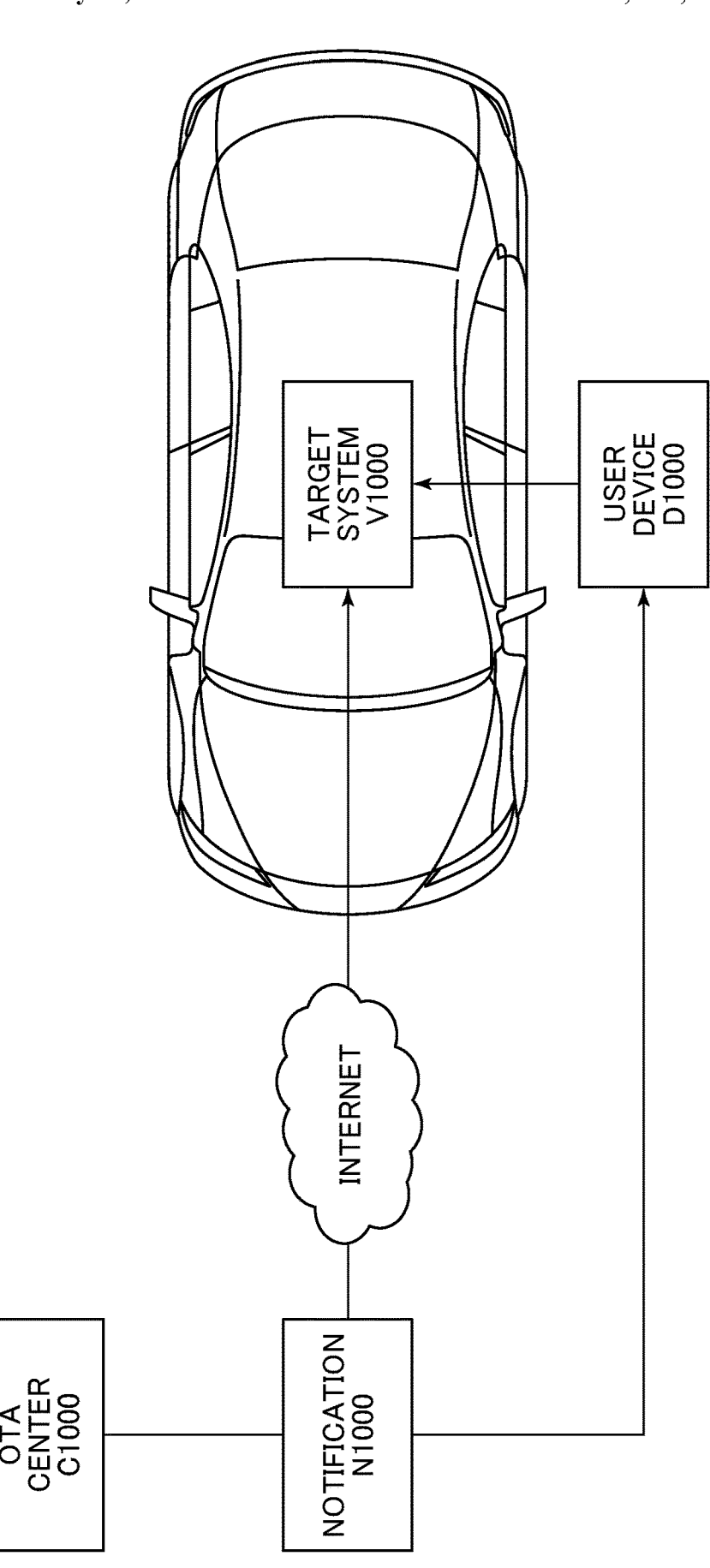
FIG. 1 is a schematic block diagram illustrating an overall configuration of a software updating system to which a software updating device according to the present invention is applied.

Hereinafter, an embodiment of the present invention will be described with reference to the drawings. FIG. 1 is a diagram illustrating constituent elements of an entire software updating system to which a software updating device according to the embodiment of the present invention is applied. The software updating system includes a target system V1000, a user device D1000, and an OTA center C1000. The target system V1000 is, for example, a system installed in a vehicle, and may be constituted by a plurality of information processing units for executing a specific function. The target system V1000 can be connected to a wireless updating system via a communication system. FIG. 1 illustrates the wireless updating system as the OTA center C1000. The OTA center (managing server) C1000 can transfer necessary software to the target system V1000 by using a notification N1000. Similarly, the user device D1000 can communicate with the OTA center C1000 and the target system V1000.

Figure 2:
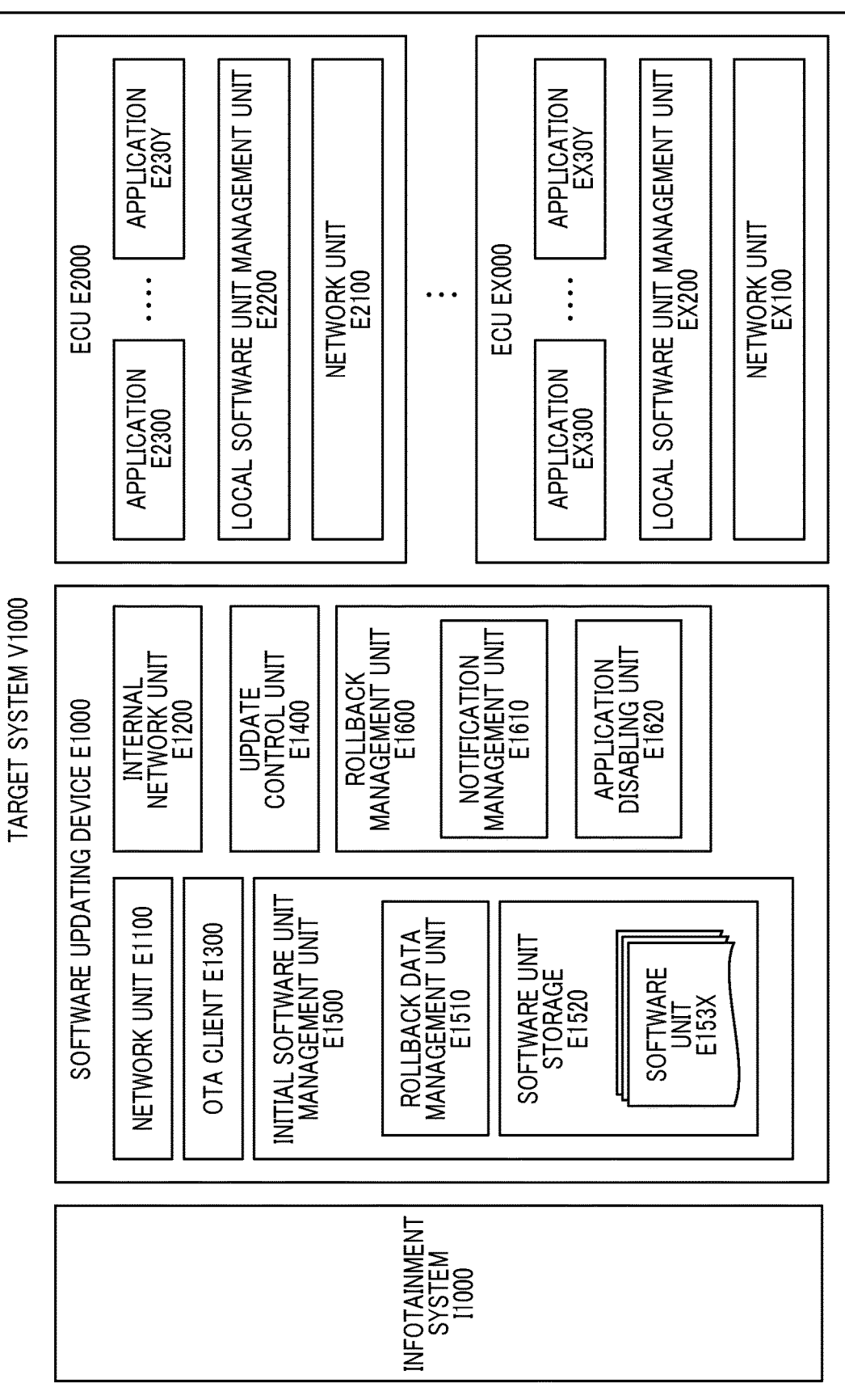
FIG. 2 is a functional block diagram illustrating a configuration of a target system V1000.

FIG. 2 is a block diagram illustrating a configuration of the target system V1000. The target system V1000 includes, for example, a software updating device E1000, any number of ECUs_EX000, and an infotainment system I1000. The software updating device E1000 is hardware including a processor and a memory and is installed in the vehicle. The software updating device E1000 also provides a function of changing and rolling back software of the system. The ECU (Electronic Control Unit) is a vehicular control device and has various functions for controlling the vehicle. The infotainment system I1000 provides an interface between a user and the system.

The configuration of the software updating device E1000 will be more specifically described. The software updating device E1000 includes, for example, a network unit E1100, an internal network unit E1200, an update control unit E1400, an initial software unit management unit E1500, and a rollback management unit E1600. The network unit E1100 communicates with the outside of the target system V1000. The internal network unit E1200 performs communication in the target system V1000. The update control unit E1400 manages a software unit update process in the target system V1000, the initial software unit management unit E1500, and the rollback management unit E1600.

The initial software unit management unit E1500 monitors and tracks software units installed in the target system V1000 and the ECU_EX000 being executed. The initial software unit management unit E1500 includes software unit storage E1520 that stores a software unit E153X that may be used in the second half of the life cycle of the target system V1000, and a rollback data management unit E1510 that manages a label group UX400 attached to the software unit stored in the software unit storage E1520. The label group UX400 is used to determine whether rollback using information that is locally available is possible.

The rollback management unit E1600 processes the notification N1000. The rollback management unit E1600 further includes a notification management unit E1610 that directly processes the notification N1000, and an application disabling unit E1620 that cooperates with the initial software unit management unit E1500 and a local software unit management unit EX200 specific to the ECU_EX000 in case of desiredly disabling the specified application E30Y to identify a destination to which a signal is transmitted.

The ECU_EX000 includes, for example, any number of applications EX30Y, the local software unit management unit EX200, and a network unit EX100. The application EX30Y is installed by a software unit and implements various functions of the target system V1000. The local software unit management unit EX200 monitors and tracks a software unit UX000 locally stored on the ECU_EX000. The network unit EX100 communicates with the other constituent elements of the target system V1000.

Figure 3:
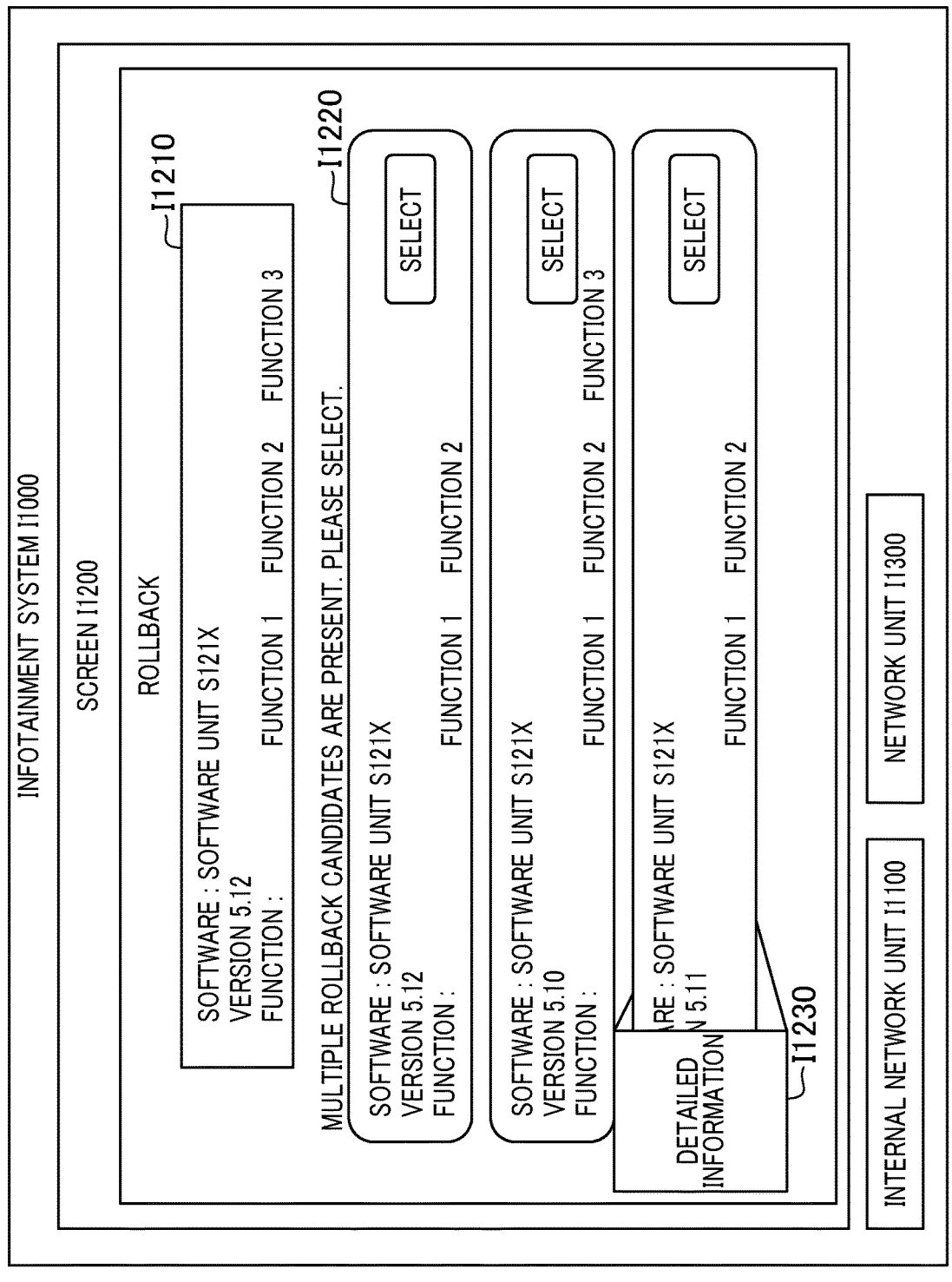
FIG. 3 is a functional block diagram illustrating a configuration of an infotainment system I1000.

FIG. 3 is a block diagram illustrating a configuration of the infotainment system I1000 included in the target system V1000. The infotainment system I1000 includes, for example, an internal network unit I1100, a network unit I1300, and a screen I1200. The internal network unit I1100 communicates with the other constituent elements in the system. The network unit I1300 communicates with a device outside the system. The screen I1200 functions as a user interface, and presents information to the user and receives information from the user.

Figure 4:
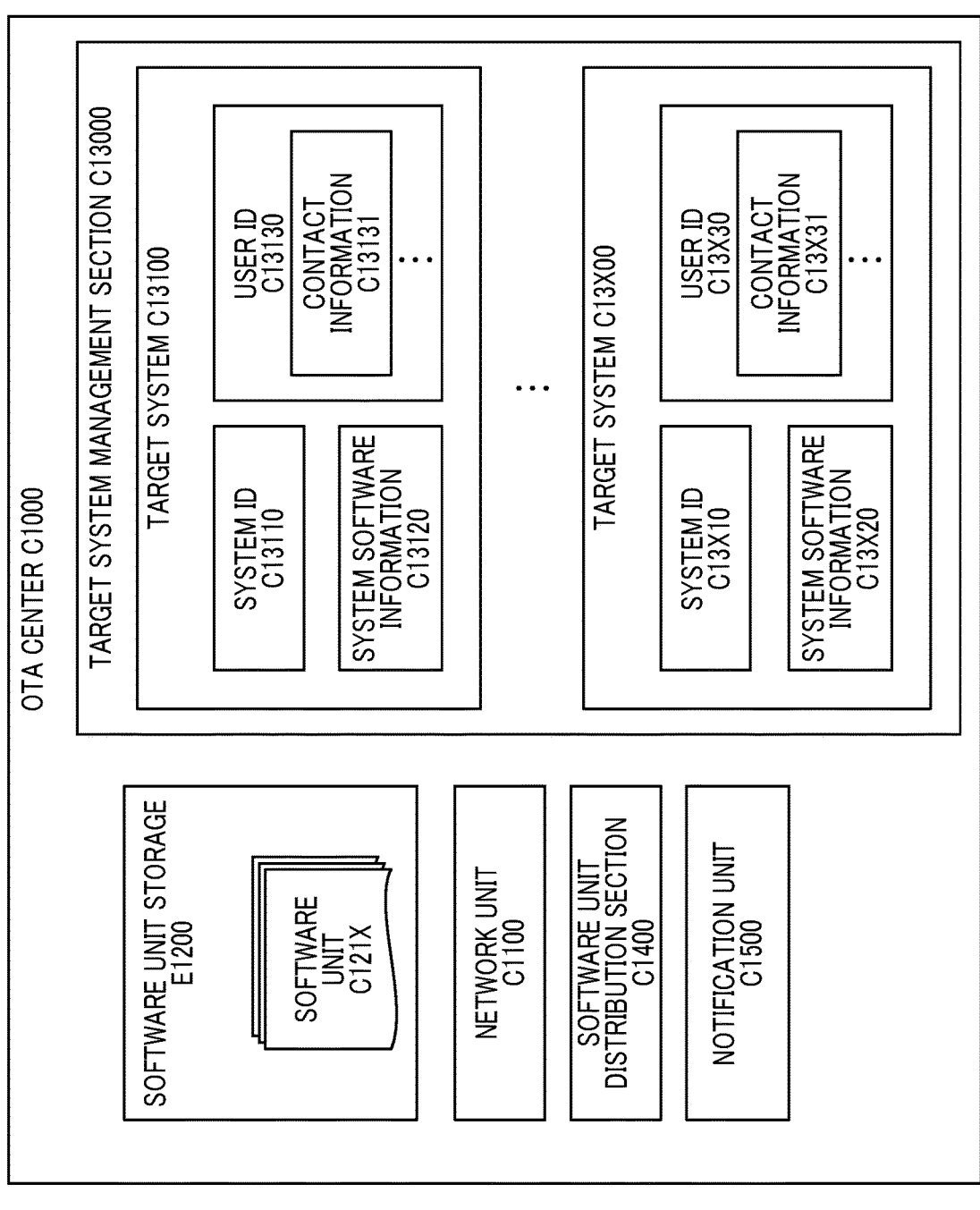
FIG. 4 is a functional block diagram illustrating a configuration of an OTA center C1000.

FIG. 4 is a block diagram illustrating a detailed configuration of the OTA center C1000. The OTA center C1000 includes information and authentication necessary for changing software installation to the target system V1000. The OTA center C1000 includes a network unit C1100, software unit storage C1200, a target system management section C13000, a software unit distribution section C1400, and a notification unit C1500.

The network unit C1100 communicates with the target system V1000 or the user device D1000 to provide information for changing the system. The software unit storage C1200 stores the software unit UX000 to be used to change software on the target system V1000. The target system management section C13000 keeps information regarding the target system V1000 and registration information regarding the user. The software unit distribution section C1400 performs processing of transmitting the necessary notification N1000 and the software unit UX000 to the target system V1000. The notification unit C1500 creates the notification N1000.

The target system management section C13000 further includes a list of a plurality of target systems C13X00. In each list, a system ID_C13X10, system software information C13X20, and a user ID_C13X30 are included. The system ID_C13X10 is an identifier for each target system V1000. The system software information C13X20 is a logical or physical internal component and is detailed information regarding a software unit used in the related target system V1000. The user ID_C13X30 is information regarding contact information of a user of the related target system V1000. The user ID_C13X30 further includes contact information C13X31 regarding a method for contacting the user of the target system V1000. In a case where a certain specific user ID_C13X30 includes a plurality of contact information items, the contact information C13X31 also functions as a list of contact information.

Figure 5:
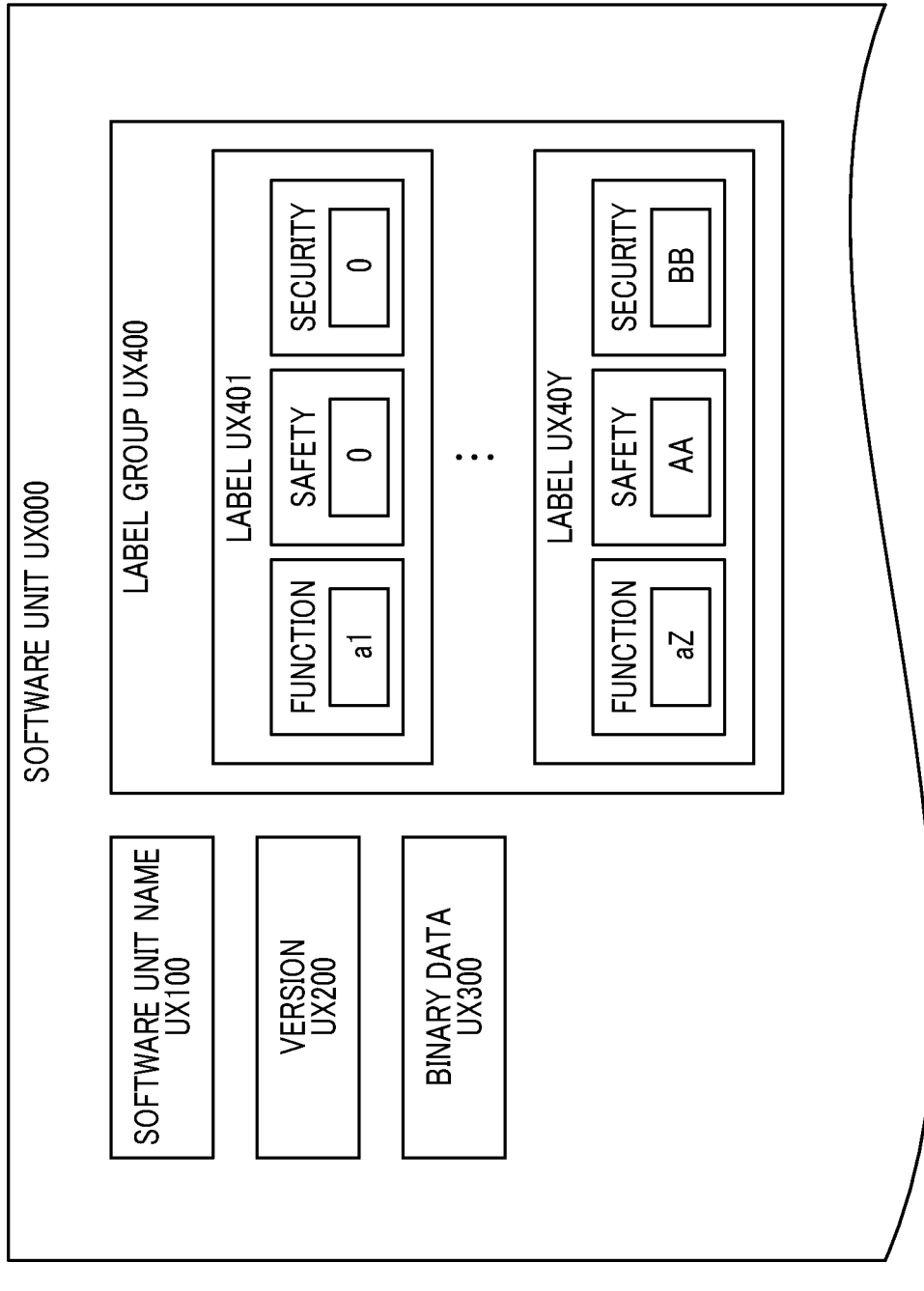
FIG. 5 is a functional block diagram illustrating a configuration of a software unit UX000.

FIG. 5 is a diagram illustrating a data structure of the software unit UX000. The software unit UX000 includes a software unit name UX100 that is a general software name, a version UX200, binary data UX300, and a label group UX400. The version UX200 is a management scheme that is used to notify a change to a binary and a source code. The binary data UX300 is data for replacing a binary designated in the target system V1000. The label group UX400 is additional information attached to the software unit UX000 in order to provide a function per binary and track a change to safety for the function.

Each label can only be compared with a label of the same type. That is, only labels of functions are compared between different types of software, only labels for safety are compared between different types of software, and only labels for security are compared between different types of software. Each function and a change in the function may be stored in a label UX40Y format such that the function and the change can be easily accessed when necessary. Labels may not need to be given to all software units. This is due to the fact that, when the binary data UX300 included in the software unit used for the notification N1000 includes a transmission type N1100, cost unnecessary for network transmission may occur.

Figure 6:
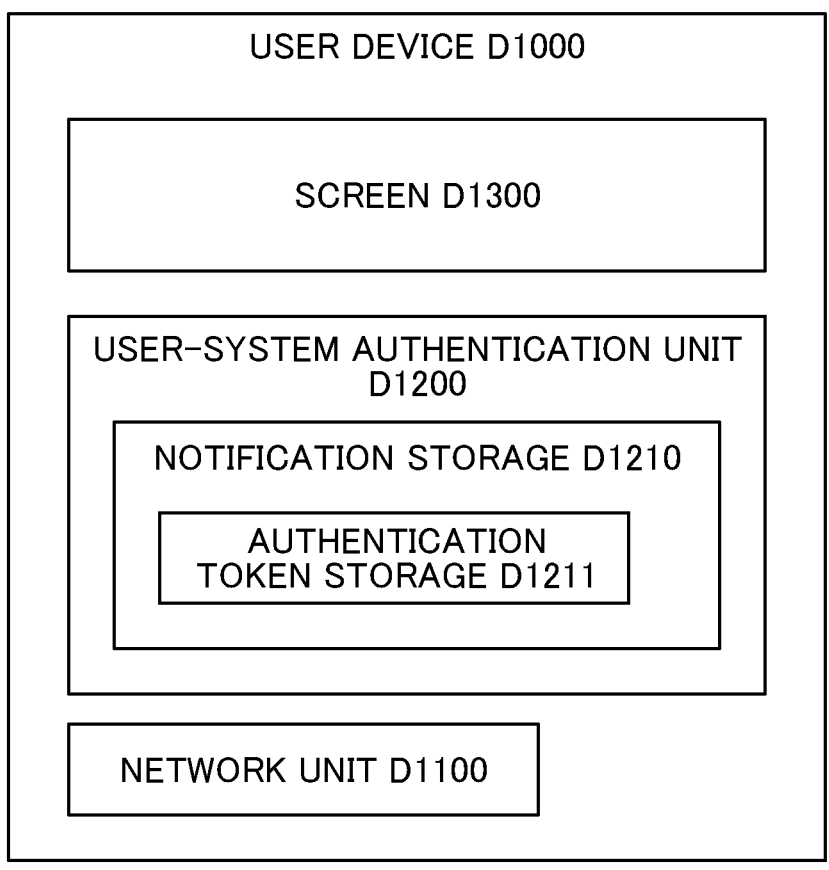
FIG. 6 is a functional block diagram illustrating a configuration of a user device D1000.

FIG. 6 is a block diagram illustrating a configuration of the user device D1000. The user device D1000 is a component separate from the target system V1000 or the OTA center C1000 and can be used as a proxy of the notification N1000 by an end user. The user device D1000 can take various formats. The user device D1000 includes a network unit D1100, a user-system authentication unit D1200 for securing a method of communicating with the target system V1000 via a user-system authentication unit, and safe communication with the target system V1000, and a screen D1300. The user communicates with the target system V1000 via this network unit D1100. The screen D1300 functions as a user interface, and displays information to the user and receives information from the user.

Figure 7:
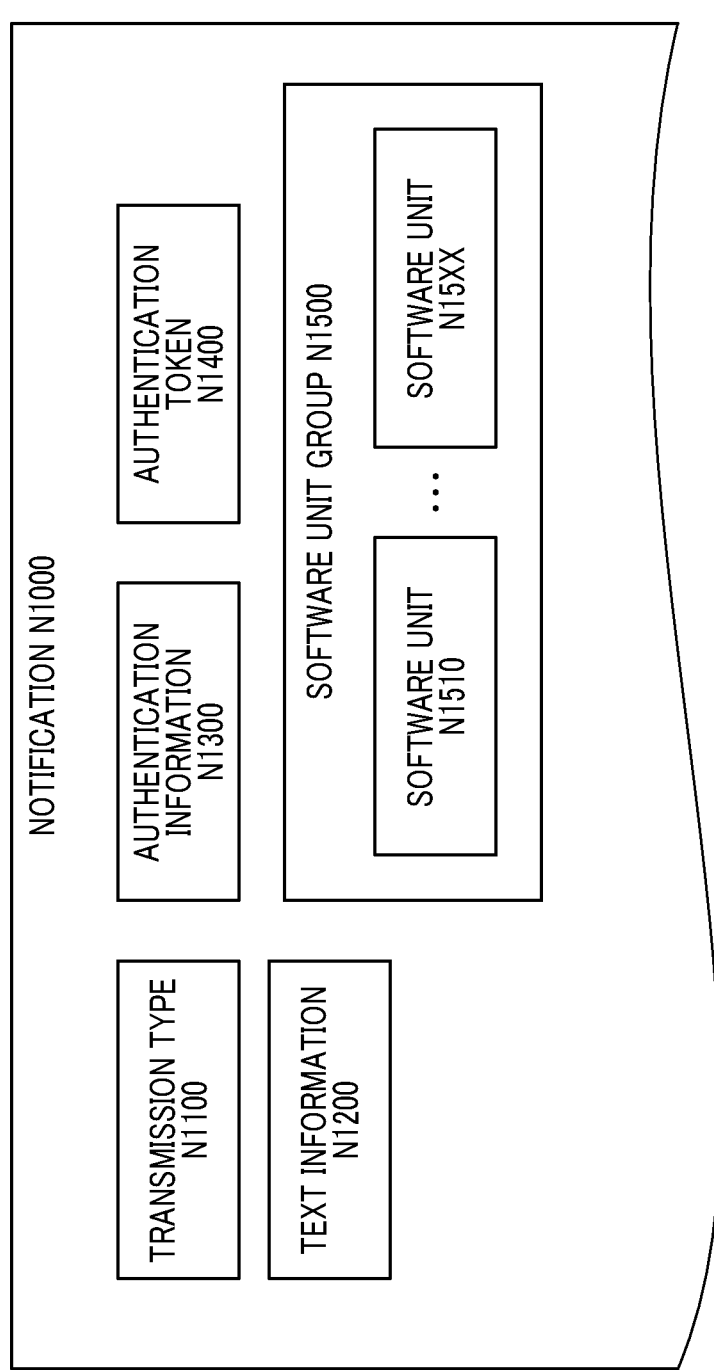
FIG. 7 is a functional block diagram illustrating information included in a notification N1000.

FIG. 7 illustrates details of the notification N1000. The notification N1000 is in a format to be used to transmit information from the OTA center C1000 to the target system V1000. The target system V1000 can properly process a change of software being executed in the system. Particularly, the software unit UX000 is transferred by the notification N1000 to the initial software unit management unit E1500 of the target system V1000 and the linked local software unit management unit EX200 and processed.

The notification N1000 includes a transmission type N1100, text information N1200, authentication information N1300, an authentication token N1400, and a software unit group N1500. The transmission type N1100 indicates a type of the notification to be transmitted. The text information N1200 indicates readable information regarding the notification N1000. The authentication information N1300 is used by the target system V1000 in order to authenticate the notification. The authentication token N1400 is individual authentication information requiring higher security. A software unit N15XX included in the software unit group N1500 is the software unit UX000 linked in the notification N1000 (see FIG. 5).

The software unit UX000 is in a format to be used for a software unit storage and the notification N1000 in order to transmit information necessary to change software installed in the target system V1000. A trackable safe method for changing software on the target system V1000 is created in accordance with this format.

Figure 8:
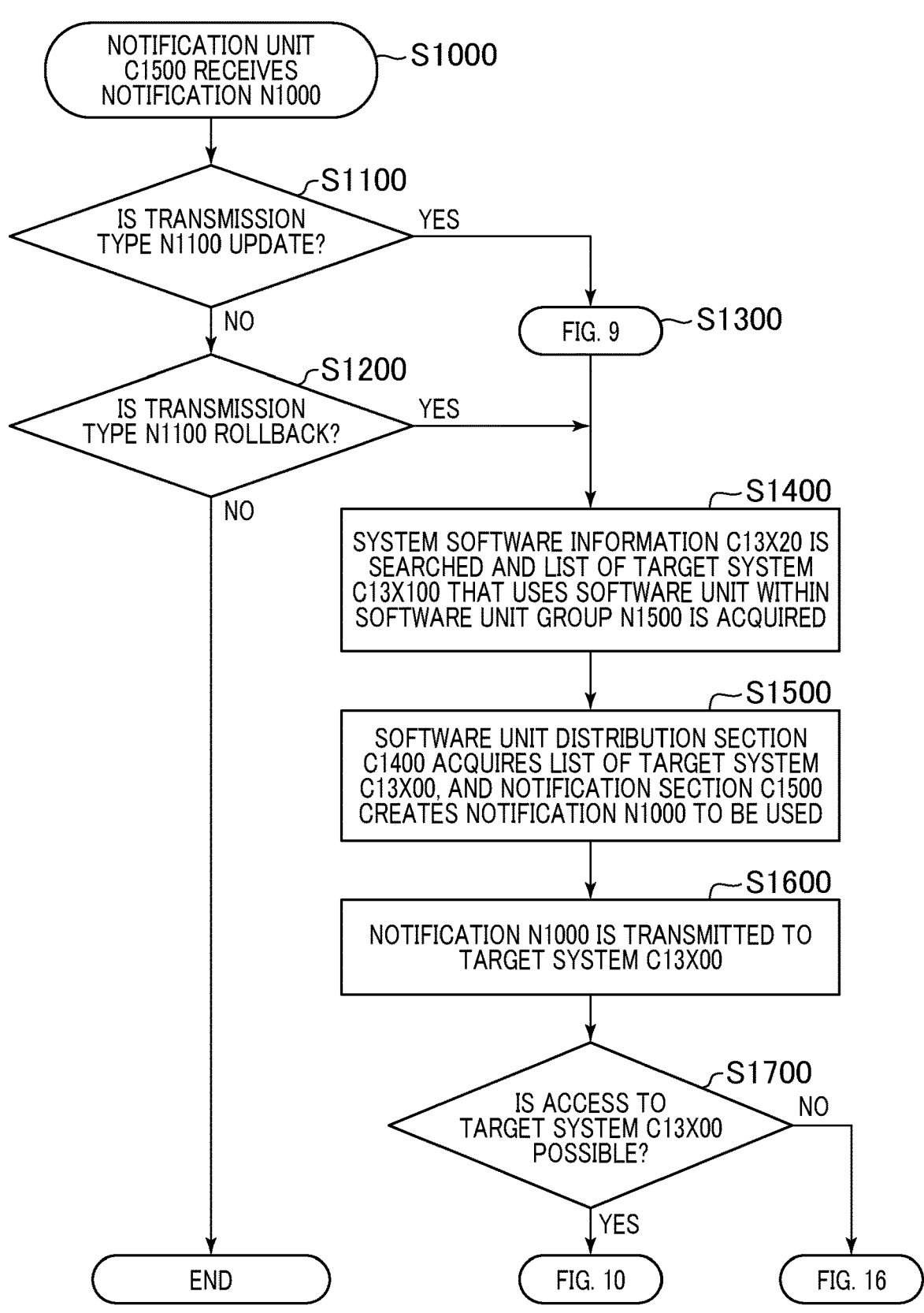
FIG. 8 is a flowchart illustrating a process to be performed by the software updating device.

FIG. 8 is a flowchart illustrating a process in the OTA center C1000 to acquire a notification N1000 indicating that a specific software unit needs to be changed in the first embodiment. The notification N1000 is received by the notification unit C1500 of the OTA center C1000 (step S1000). Subsequently, the notification unit C1500 determines whether or not a transmission type N1100 indicates an update (step S1100). In a case where the notification unit C1500 determines that the transmission type N1100 does not indicate an update, the notification unit C1500 determines whether or not the transmission type N1100 indicates rollback (step S1200). In a case where the notification unit C1500 determines that the transmission type N1100 does not indicate rollback, the process is ended. In a case where the notification unit C1500 determines that the transmission type N1100 indicates rollback, the process proceeds to step S1400. In a case where the notification unit C1500 determines that the transmission type N1100 indicates an update in step S1100, the process proceeds to a process illustrated in FIG. 9 (step S1300). The transmission type N1100 indicating an update means that it is necessary to update the software unit storage C1200 of the OTA center C1000.

Figure 9:
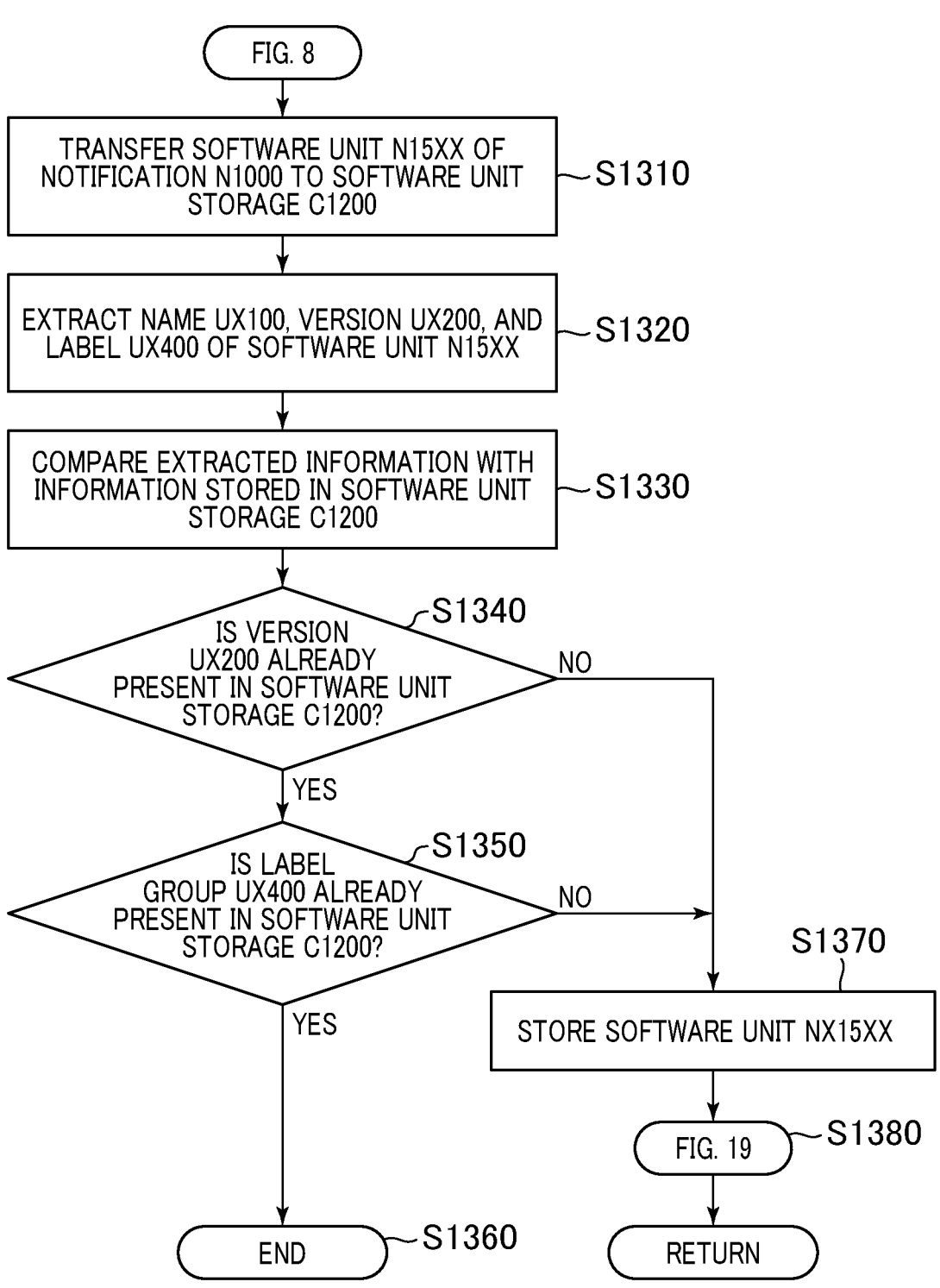
FIG. 9 is a flowchart illustrating a process of updating software unit storage.

The process procedure illustrated in FIG. 9 is applied to the update of the software unit storage C1200. The software unit N15XX of the notification N1000 is extracted by the notification unit C1500 and transferred to the software unit storage C1200 (step S1310). The name UX100, the version UX200, and the label group UX400 of the software unit N15XX are extracted from the software unit storage C1200 (step S1320). The extracted information is compared with information already available in the software unit storage C1200 (step S1330). Particularly, the version UX200 is compared in step S1340, and the label group UX400 is compared in step S1350.

In a case where both information items that are the version UX200 and the label group UX400 of the software are not new, that is, in a case where the results of steps S1340 and S1350 illustrated in FIG. 9 are both "Yes", the process is stopped (step S1360). Both the information items are not present in the software unit storage C1200, the software unit N15XX is stored (step S1370). Then, the process proceeds to step S1380 and a process procedure illustrated in FIG. 19 is performed.

Figure 19:
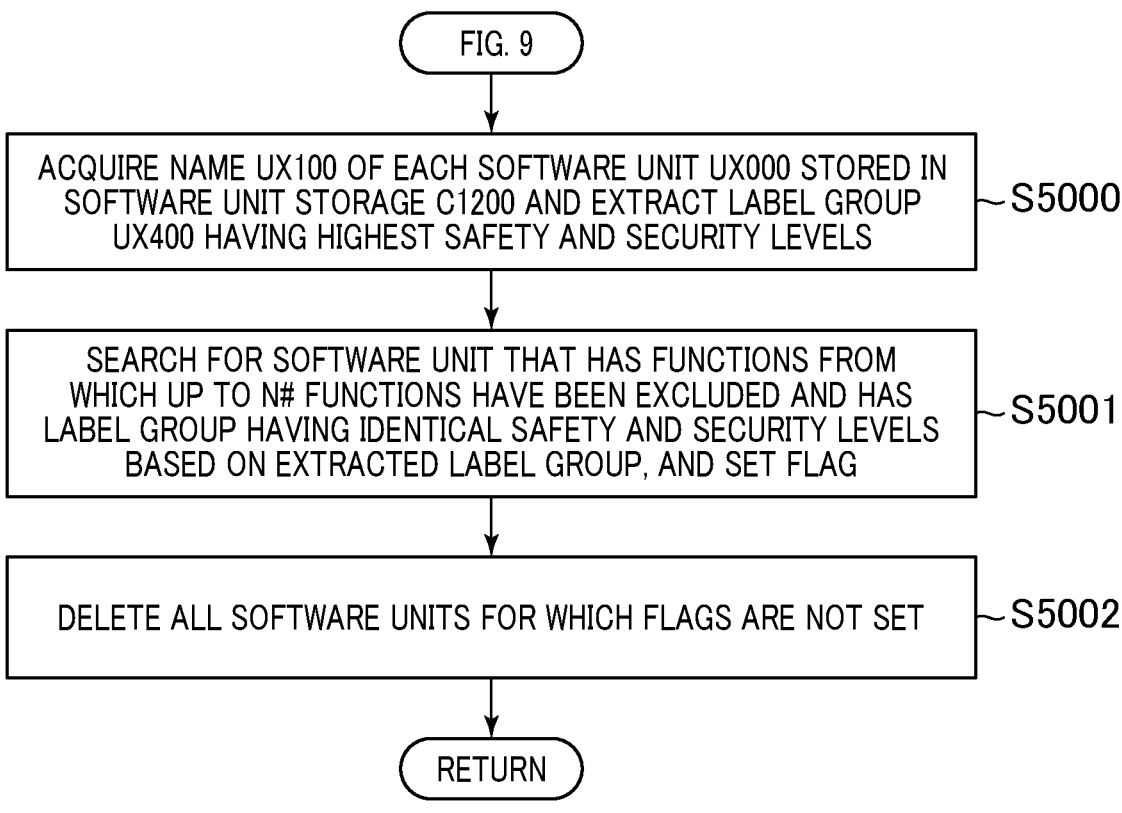
FIG. 19 is a flowchart illustrating a process of reducing the capacity of the software unit storage.

FIG. 19 is a flowchart illustrating a process of reducing a storage region in the software unit storage using the label group UX400 when the software unit storage C1200 is used for the purpose of rollback.

To reduce the storage region for software, the software unit storage C1200 first acquires the software unit name UX100 and extracts a label group UX400 with the highest safety and security levels in the software unit storage C1200 (step S5000). This label group UX400 indicates that all functions for the determined safety and security labels are provided.

Even in a case where a label is not attached to any one or more of all the functions, it is possible to confirm a software unit in which safety and security labels are identical in the software unit storage C1200 from the label group UX400 with the highest security and safety levels. Based on this information, an integer N# is selected, and a flag is set for a software unit that has functions from which up to N# functions have been excluded, and has identical safety and security labels (step S5001). Regarding rollback, particularly, even in a case where a function is not sufficient in a version of any safety and security, it is preferable that a region in which a small number of software units are stored in the target system V1000.

Lastly, all software units UX000 for which flags are not set are deleted (step S5002). In this manner, the storage region for software units is reduced.

Returning to the procedure illustrated in FIG. 8, the target system management section C13000 of the OTA center C1000 searches for system software information C13X20 that is an internal structure thereof, and finds a target system C13X00 that uses a software unit present in the software unit group N1500. From this search, the OTA center C1000 acquires a list of the target system C13X00 that is a destination to which a notification N1000 is distributed (step S1400). This information is given to the software unit distribution section C1400.

The software unit distribution section C1400 uses the acquired list to create the necessary notification N1000, particularly, personalized text information N1200, authentication information N1300, and a software unit to be used in the software unit group N1500 (step S1500). This is due to the fact that target systems V1000 have different configurations, and that an additional software unit or further authentication may be required for update.

The created notification N1000 is transmitted to the corresponding target system C13X00 via the network unit C1100 of the OTA center C1000 (step S1600). Thus, it is possible to determine whether or not the target system C13X00 can be accessed (step S1700). Therefore, various options are given to the OTA center C1000.

Figure 10:
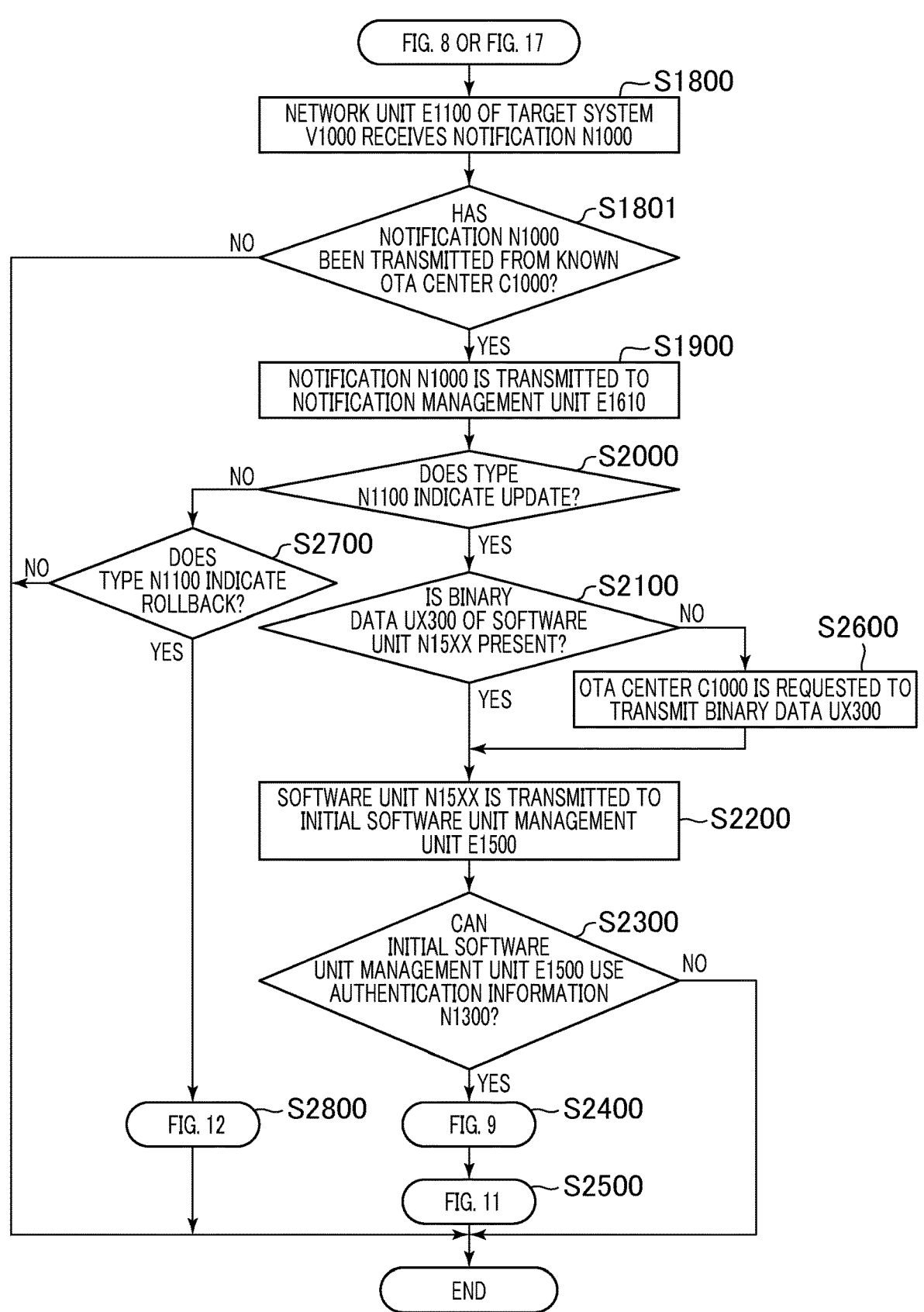
FIG. 10 is a flowchart illustrating a process of managing a notification by the target system.

In a case where the OTA center C1000 can access the target system C13X00, a procedure illustrated in FIG. 10 is used. The network unit E1100 receives the notification N1000 of the target system V1000 (step S1800). The notification management unit E1610 determines whether or not the notification N1000 has been transmitted from the known OTA center C1000 (step S1801). This is performed by the notification management unit E1610 verifying the authentication token N1400 within the notification N1000. In a case where the token can be verified by any authentication system, the process is continued. In a case where the token cannot be verified, the process is ended. In a case where the target system V1000 is directly connected to the OTA center C1000, this processing is skipped. Next, the notification N1000 is transmitted to the notification management unit E1610 of the rollback management unit E1600 (step S1900). Then, it is determined whether or not the transmission type N1100 indicates an update (step S2000).

In a case where it is determined that the transmission type N1100 indicates an update, the process proceeds to step S2100. In step S2100, since the binary data UX300 of the software unit N15XX is finally required to change the software unit of the target system V1000, whether or not it is possible to use the data is checked. In a case where the binary data is not included in the notification N1000, the binary data UX300 can be acquired from the corresponding OTA center C1000 (step S2600).

Regardless of a method of acquiring the software unit N15XX and the binary data UX300, the software unit N15XX is transmitted to the initial software unit management unit E1500 (step S2200). Before a change is applied, it is determined whether the initial software unit management unit E1500 can use the authentication information N1300 (step S2300). In a case where the initial software unit management unit E1500 cannot use the authentication information N1300, that is, in a case where authentication has failed, the process is ended. In a case where the authentication has been successful, the process returns to the process procedure illustrated in FIG. 9, and the sequence of updating the software unit storage of the initial software unit management unit E1500 is performed (step S2400). Next, the process proceeds to a process procedure illustrated in FIG. 11 and the software unit is changed in the target system V1000 (step 2500).

FIG. 11 is a flowchart illustrating a method of changing a software unit. First, the initial software unit management unit E1500 identifies a list of ECUs_EX000 in which the software unit N15XX is used. Then, the identified list and the software unit N15XX are transmitted to the update control unit E1400 (step S2501). The update control unit E1400 uses this information to acquire the software unit N15XX and transfers the software unit N15XX to each ECU_EX000 within the list via the internal network unit E1200 (step S2502). Each ECU_EX000 within the list receives the software unit N15XX via the corresponding network unit EX100 and stores the software unit in the local software unit management unit EX200 (step S2503). Each local software unit management unit EX200 performs processing of changing related binary data using information included in the binary data UX300 of the ECU_EX000 (step S2504).

Each local software unit management unit EX200 transmits the processing result to the update control unit E1400 via the network unit EX100 (step S2505). The update control unit E1400 acquires all processing results for each ECU_EX000 within the original list and notifies the notification management unit E1610 of the processing results (step S2506). The notification management unit E1610 acquires the final processing results, notifies the transmitter of the notification N1000 of the processing results, and completes the procedure of updating the software unit (step S2507).

Figure 12:
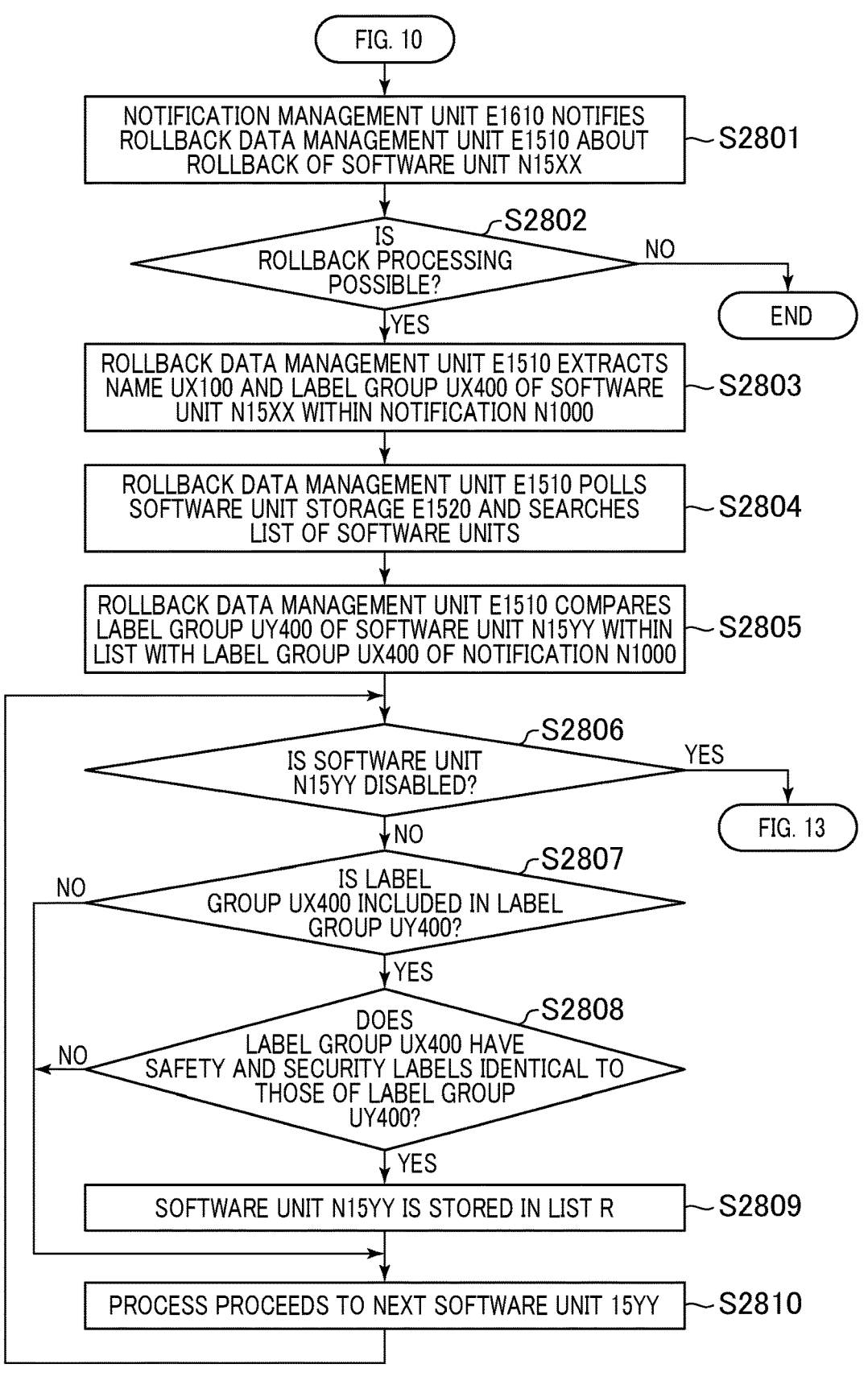
FIG. 12 is a flowchart illustrating a rollback process in the target system.

Returning to the procedure illustrated in FIG. 10 again, in a case where the transmission type N1100 of the notification N1000 indicates rollback (step S2700), the process proceeds to FIG. 12 (step S2800). FIG. 12 illustrates a rollback process in the target system V1000.

The notification management unit E1610 notifies the rollback data management unit E1510 of rollback of the software unit N15XX (step S2801). Since the rollback is more highly confidential, it is determined whether the rollback process can be performed reusing the authentication information N1300 included in the notification N1000 (step S2802). In a case where this authentication has failed, the process is interrupted. In a case where the authentication has been successful, the rollback data management unit E1510 extracts the name UX100 and the label group UX400 of the software unit N15XX within the notification N1000 (step S2803). The rollback data management unit E1510 uses this information to poll the software unit storage E1520 and search a list of an available software unit 15YY (step S2804). The rollback data management unit E1510 compares a label group UY400 of the software unit 15YY within the searched list with the label group UX400 of the notification N1000 (step S2805).

It is determined whether or not each software unit N15YY within the list is disabled (step S2806). In a case where the software unit N15YY is not disabled, it is determined whether or not the label group UX400 of the software unit N15XX is included in the label group UY400 of the software unit 15YY (step S2807). In a case where the label group UX400 is included in the label group UY400, it is determined whether or not the label group UX400 includes safety and security labels identical to those of the label group UY (step S2808). In a case where the label group UY400 includes safety and security labels identical to those of the label group UY400, the software unit 15YY is stored in another list (R) (step S2809). Therefore, although not all functions may be covered, all security labels and safety labels of functions associated with the software units are identical. Note that the versions UX200 of the software units are not considered at this time.

In a case where the result of step S2807 or S2808 is "No", the next software unit within the list is processed as a software unit 15YY (step S2810). When the process is completely performed on all the software units within the list, the process proceeds to FIG. 13 ("Yes" in step S2806).

Figure 13:
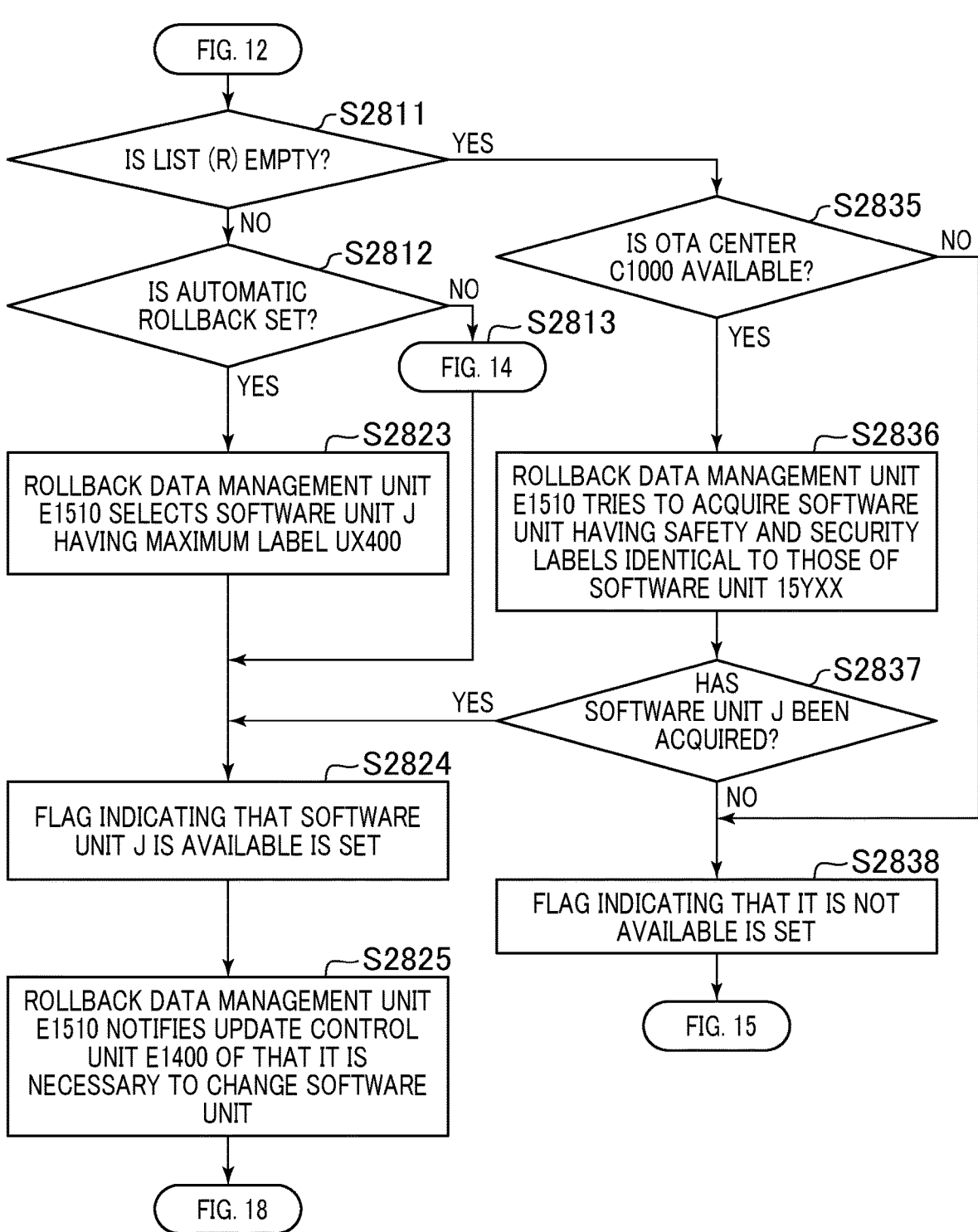
FIG. 13 is a flowchart illustrating a process of selecting software to be rolled back.

FIG. 13 illustrates a process of selecting a unit to be rolled back. First, it is checked whether the list (R) is empty (step S2811). In a case where the list (R) is not empty, it is checked whether automatic rollback has been set (step S2812). In a case where the automatic rollback has been set, the rollback data management unit E1510 selects a software unit J having the maximum label group UX400 (step S2823). This means that the number of labels UX40Y included in the software unit is the largest.

In a case where the numbers of labels UX40Y included in label groups UX400 are the same, the comparison of the versions UX200 can be used. When the software unit J is selected, a flag is set (step S2824). The rollback data management unit E1510 reads the flag and notifies the update control unit E1400 of that it is necessary to change the software unit (step S2825). The software unit is changed in accordance with a procedure illustrated in FIG. 18.

In the procedure illustrated in FIG. 18, first, the initial software unit management unit E1500 determines and extracts a list of ECUs_EX000 having software units N15XX to be rolled back and transmits the extracted list to the update control unit E1400 (step S2826). Next, the update control unit E1400 uses the authentication information N1300 to transmit information regarding a necessary rollback procedure to the local software unit management units EX200 of all the ECUs_EX000 within the list (step S2827).

Information indicating an update enabled state is transmitted to the update control unit E1400 for each of the local software unit management units EX200 successfully authenticated using the authentication information N1300 (step S2828). How to handle the existing software units N15XX is arbitrary, and the software units N15XX may not be replaced. The update control unit E1400 transfers the software unit J to be rolled back to each ECU_EX000 via the internal network unit E1200 (step S2829).

In each ECU_EX000, the software unit J is transmitted to the local software unit management unit EX200 (step S2830). Each local software unit management unit EX200 uses the binary data UX300 of the software unit J to perform an update necessary for the original software unit N15XX, that is, rolls back or replaces the software unit (step S2831). The processing results are transmitted to the update control unit E1400 via the network unit EX100 (step S2832). The update control unit E1400 acquires the results of changing all the software units N15XX by the software unit J and transmits the results to the notification management unit E1610 (step S2833). The notification management unit E1610 notifies the transmitter of the notification N1000 of the operation results via the network unit E1100 (step S2834). In the above-described way, the safe and high-security rollback for the software units of the target system V1000 is ended.

Return to the procedure illustrated in FIG. 13. In a case where the result of step S2811 is "Yes", that is, in a case where the list (R) is empty, this means that the software unit storage E1520 of the initial software unit management unit E1500 does not extract a software unit having safety and security labels identical to those of the software unit 15XX in the process illustrated in FIG. 12. In this case, first, it is determined whether or not an OTA function is available (step S2835). In a case where the OTA function is available, the rollback data management unit E1510 tries to acquire at least a software unit having a safety label and a security label that are identical (step S2836). This is performed by checking from the rollback data management unit E1510 via the notification management unit E1610 whether or not an OTA client E1300 has such a software unit. In this case, it is not necessary that all labels are identical for functions.

In a case where the software unit can be acquired from the OTA client E1300 as a communication destination (step S2837, Yes), the process returns to the above-described step S2824 and the process is continued. In a case where the OTA function is not available (step S2835), or in a case where a connection to a designated OTA center C1000 has failed (step S2837, No), a flag indicating that rollback is not available is set by the rollback data management unit E1510 (step S2838).

FIG. 15 illustrates a process that is performed when the flag indicating that the rollback is not available is set in step S2838. Specifically, in a case where a target that can be rolled back is not present, the target system V1000 performs processing of disabling a software unit N15XX having a problem. First, upon receiving a notification indicating that a rollback candidate is not present, the notification management unit E1610 notifies the application disabling unit E1620 of the software unit N15XX to be disabled (step S2839). The application disabling unit E1620 cooperates with the initial software unit management unit E1500 to determine which ECU_EX000 in the target system V1000 is executing the software unit N15XX, and create a list (step S2840). The created list is transmitted to the update control unit E1400 (step S2841).

The update control unit E1400 uses the authentication information N1300 to notifies the local software unit management unit EX200 of each ECU_EX000 within the list created in step S2840 of disabling of the software unit N15XX via the network unit EX100 (step S2842). The application disabling unit E1620 notifies each authenticated ECU_EX000 of that the software unit N15XX is to be disabled via the internal network unit E1200 (step S2843).

In each ECU_EX000, the local software unit management unit EX200 tries to disable the software unit N15XX, and transmits the result of the processing to the application disabling unit E1620 (step S2844). The application disabling unit E1620 analyzes the received processing result and transmits the processing result to the notification management unit E1610 (step S2845). The application disabling unit E1620 notifies the update control unit E1400 of a change in the status of the software unit. This change is recorded in the initial software unit management unit E1500 (step S2846). When the disabling of the software unit 15XX ends, the target system V1000 is regarded to be safe and highly secure, and a function of the software unit 15XX stops. The notification management unit E1610 notifies the designated transmitter of a notification N1000 indicating this result via the network unit E1100 (step S2847).

Second Embodiment

Figure 14:
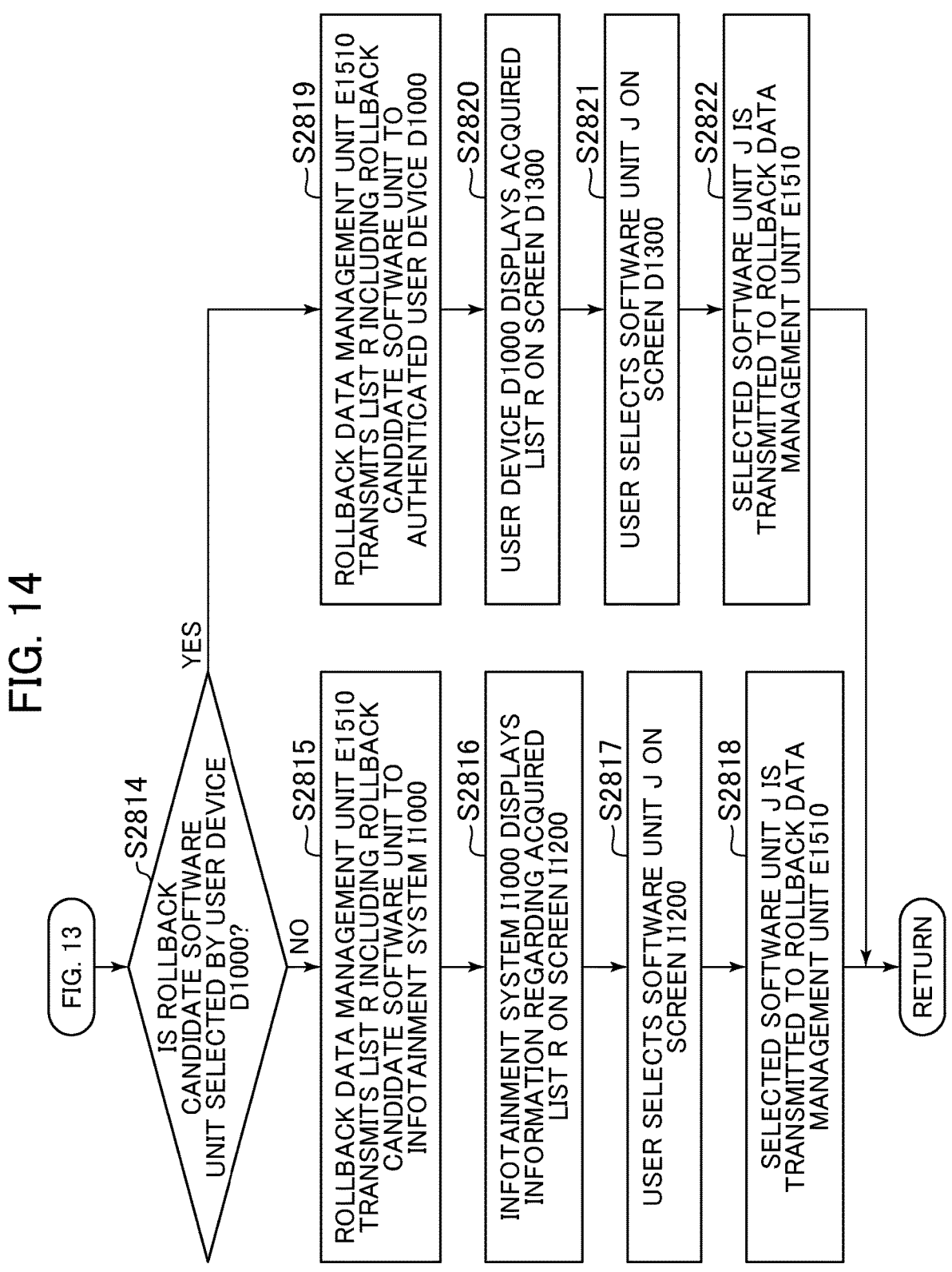
FIG. 14 is a flowchart illustrating a process of selecting software to be rolled back via the infotainment system or the user device.

Next, a second embodiment of the present invention will be described. In the second embodiment, in step S2812 of the procedure illustrated in FIG. 13, processing is performed in a case where automatic rollback is not set, and specifically, a software unit N15XX is rolled back by a non-automatic method (step S2813). Although it is preferable that automatic rollback is usually selected, a user can select safety and security levels. That is, in the present embodiment, a process of selecting a rollback candidate by the user himself/herself is performed. FIG. 14 illustrates the process of selecting a rollback candidate.

A rollback candidate can be selected using the user device D1000 or the infotainment system I1000 of the target system V1000 (step S2814). In a case where the infotainment system I1000 is used, the rollback data management unit E1510 transmits a list (R) of an available software unit to the infotainment system I1000 via the internal network unit E1200 (step S2815). The infotainment system I1000 displays information regarding the acquired list R on the screen I1200 (step S2816).

FIG. 3 illustrates an example of the screen I1200 on which the above-described information is displayed. A region denoted by I1210 indicates information regarding a software unit indicated in the notification N1000 and required to be rolled back. A rollback candidate is displayed in a dialog with a label I1220 attached thereto. In this case, a function available in each software unit and a version of the software unit are displayed for user's convenience. The user can select a software unit to be rolled back on the screen I1200.

One of dialogs with labels I1220 attached thereto is pressed, a more detailed description of a software unit is displayed as a dialog box with a label I1230 attached thereto. This is useful for the user to understand a change that may occur due to rollback of the software unit. The user uses a select button to select a software unit J to be rolled back (step S2817). The selected software unit J is transmitted to the rollback data management unit E1510 (step S2818). Then, the process proceeds to step S2824 (see FIG. 13) described in the first embodiment.

As indicated by steps S2819 to S2822 illustrated in FIG. 14, it is possible to use the user device D1000 to select a software unit to be rolled back. Steps S2819 to S2822 correspond to steps S2815 to S2818 in a case where the infotainment system I1000 is used. The layout of the screen D1300 on which information regarding a rollback candidate is displayed is not substantially different from the layout of the screen I1200 illustrated in FIG. 3, but the screen D1300 is different from the screen I1200 in size and fine adjustment may be required.

Third Embodiment

Next, a third embodiment of the present embodiment will be described. In the third embodiment, processing is performed in a case where the result of step S1700 in the procedure illustrated in FIG. 8 is "No", that is, in a case where it is not possible to access the target system V1000, specifically, a process procedure illustrated in FIG. 16 is performed. In a case where it is not possible to access the subjected target system V1000, the OTA center C1000 checks contact information C13X31 of a target system C13X00 listed in the target system management section C13000 and selects contact information C13X31 with which a user identified by a user ID_C13X30 can be contacted (step S3800).

It is determined whether or not a user device D1000 identified based on the selected contact information includes notification storage D1210 (step S3801). In a case where the user device D1000 includes the notification storage D1210, it is determined whether or not the user device D1000 further includes authentication token storage D1211 (step S3802). In a case where the user device D1000 does not include both the notification storage D1210 and the authentication token storage D1211, a notification N1000 including text information N1200 indicating that the OTA center C1000 cannot be connected to the target system V1000 is transmitted to the user's contact information extracted from the contact information C13X31 (step S3808).

In a case where the user device D1000 includes both the notification storage D1210 and the authentication token storage D1211, it is checked whether or not a transmission type N1100 of a notification N1000 to be transmitted indicates rollback (step S3803). In a case where the transmission type N1100 does not indicate rollback, a notification N1000 having a transmission type N1100 indicating an update is created for the user ID_C13X30 that uses the software unit N15XX, and authentication information N1300 necessary for the target system V1000 to process the notification N1000 is attached (step S3807).

In a case where the transmission type N1100 indicates rollback, a notification N1000 having a transmission type N1100 indicating rollback is created for the user ID_C13X30 (step S3804). The notification N1000 includes a software unit N15XX not including binary data UX300 and includes authentication information N1300 and an authentication token N1400. The authentication information N1300 is used to process the notification N1000. The authentication token N1400 is used for authentication of rollback. The notifications N1000 created for all the three cases described above are transmitted to the network unit C1100 (step S3805), and the user device D1000 acquires and stores the notifications N1000 via the network unit D1100 (step S3806) and the process is ended from the OTA center C1000 side.

Figure 17:
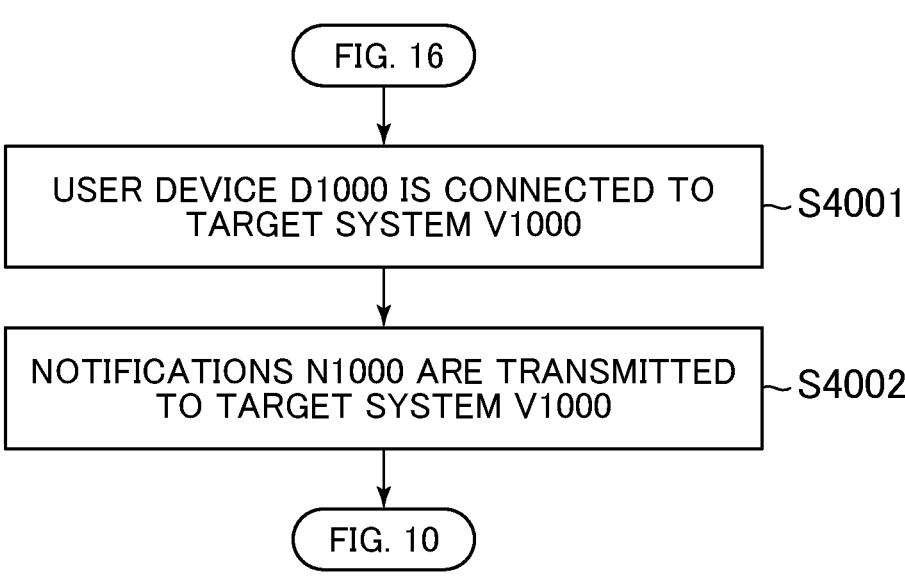
FIG. 17 is a flowchart illustrating a process of starting notification in the user device.

To continue the subsequent process, the procedure illustrated in FIG. 17 is used. The user device D1000 is connected to the target system V1000 via the network unit D1100 of the user device D1000 (step S4001). When the connection is established, the notifications N1000 are transmitted from the user device D1000 to the target system V1000 (step S4002). Thereafter, the process returns to FIG. 10 and is continued. In the above-described way, a necessary notification N1000 can be acquired from information safely and reliably stored in the user device D1000.

Fourth Embodiment

Next, a fourth embodiment of the present invention will be described. The fourth embodiment is different from the first embodiment in that a notification N1000 includes various software units N15XX. A change in a certain software unit generally depends on another software unit. The various software units can be simultaneously distributed using the format described with reference to FIG. 7. This function can be used to transmit a new safe and secure version for previous software along with a new function to prevent rollback to a much more limited version.

Figure 20:
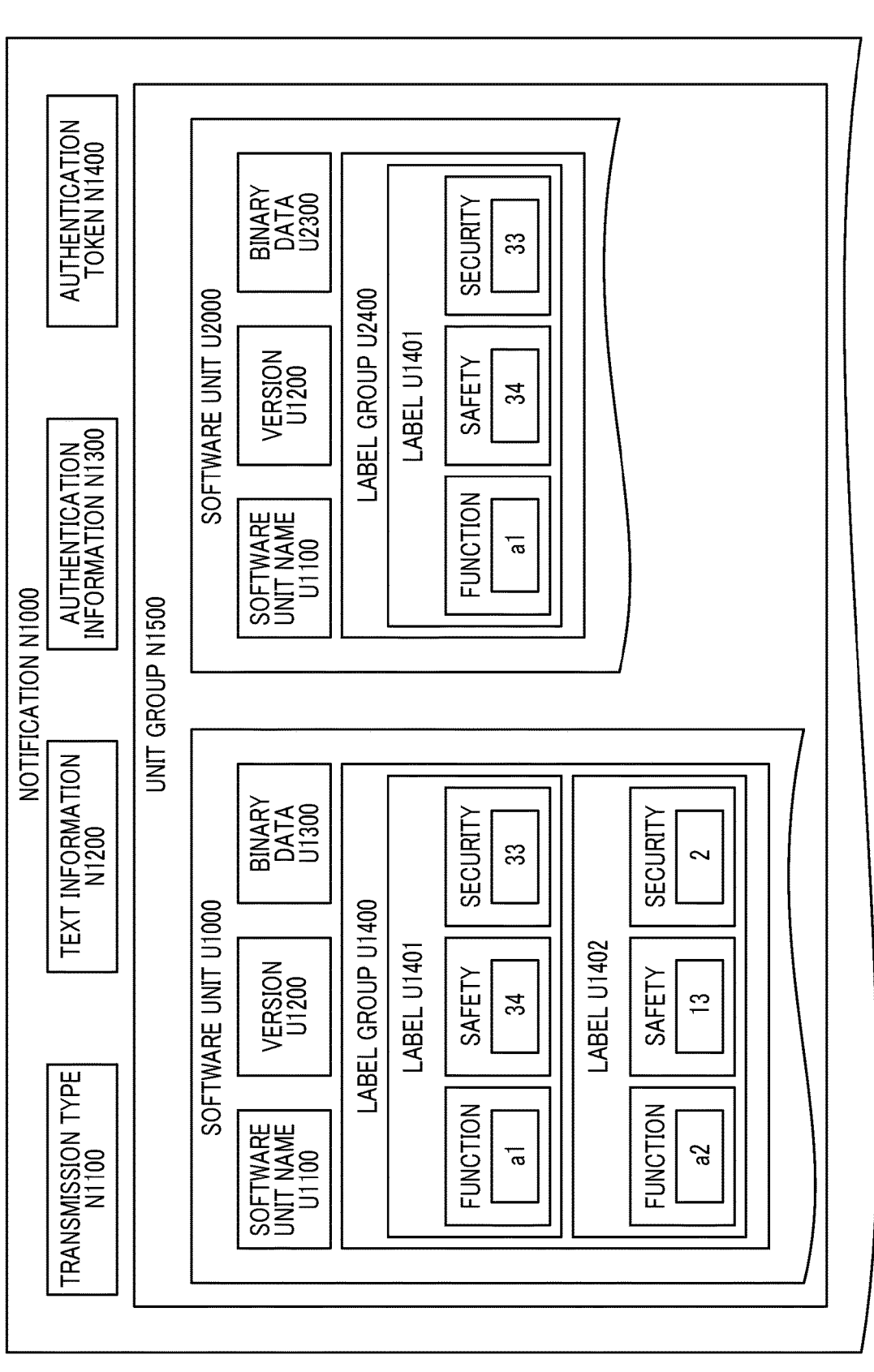
FIG. 20 is a block diagram illustrating another configuration of the notification N1000.

FIG. 20 illustrates an example of a format of a notification N1000 to be used in the present embodiment. In view of a software unit U1000, a virtual software unit U1000 including specific binary data U1300 and a label U1400 can be included in a notification N1000 having a transmission type N1100 indicating an update. In this notification N1000, a similar software unit U2000 having a label group U2400 with a reduced number of labels while maintaining safety and security labels can be included, but the number of specific functions is reduced by one (a label U1402 is not included in the label group U2400).

The software unit U2000 is not of the latest version, and has a limited function. Therefore, the software unit U2000 is not immediately installed in the target system V1000, and the software unit U1000 is prioritized. However, since the software unit U2000 includes a label U1401 of the highest level in terms of safety and security, a flag is set and both the software units U1000 and U2000 are stored in the software unit storage E1520 of the target system V1000. That is, the software unit U2000 may be one of rollback candidates described with reference to FIG. 12. When an updated version and a rollback candidate most appropriate for the updated version are simultaneously distributed using this function of the notification N1000, the probability that the rollback can be performed without access to the OTA center C1000 significantly increases.

According to the above-described embodiments of the present invention, the following effects are obtained.

(1) A software updating device according to the present invention includes software storage that stores a plurality of software units including label information; and a software update control unit that controls a software update of a vehicular control device, in which the label information includes at least safety-related information for the software units, and upon receiving a rollback command, the software update control unit selects, as a software unit to be rolled back from among the plurality of software, a software unit having safety-related label information identical to safety-related label information of a software unit installed in the vehicular control device.

With the above-described configuration, it is possible to select a software unit to be rolled back using an effect on safety of vehicular control and/or security of a vehicle as a reference, and it is possible to prevent the safety of the vehicle from being compromised.

(2) The software updating device further includes an application disabling section that disables the software unit installed in the vehicular control device in a case where the software update control unit cannot select a software unit to be rolled back from the software storage. Therefore, in a case where a software unit to be rolled back cannot be selected, it is possible to suppress the continuous execution of software having a problem and suppress danger to the vehicle.

(3) The software storage further stores updated versions of the plurality of software units stored, and the software update control unit uses any of the updated versions of the plurality of software units to roll back the software unit installed in the vehicular control device. Therefore, the software units for each stage versions are stored in the software storage, and it is possible to prevent a software unit from being rolled back to an excessively old version.

(4) The safety-related information includes reliability of vehicular control and security that prevents unauthorized access from an external. Therefore, the label information can be subdivided and rollback that more strictly ensures safety can be performed.

(5) The software updating device further includes a transceiver that can communicate with a managing server and a user terminal via a network, in which the software storage stores a plurality of programs received from the managing server via the transceiver, and the software update control unit requests the managing server to transmit an additional software unit in a case where the software update control unit cannot select a software unit to be rolled back from the software storage. This increases a probability that appropriate rollback can be performed.

(6) The software updating device further includes a transceiver that can communicate with a managing server and a user terminal via a network, the user terminal being able to communicate with the managing server via the network, in which the managing server transmits the rollback command to the user terminal in a case where communication between the transceiver and the managing server is blocked. Therefore, a user himself/herself can manage rollback and convenience for the user is improved.

The present invention is not limited to the above-described embodiments and various modifications can be made. For example, the embodiments are described above in detail in order to clearly explain the present invention. The present invention is not necessarily limited to an aspect having all the configurations described. In addition, it is possible to replace a part of a configuration of a certain embodiment with a configuration of another embodiment. In addition, it is also possible to add a configuration of another embodiment to a configuration of a certain embodiment. In addition, it is possible to delete a part of a configuration of each embodiment, and to add or replace another configuration.

REFERENCE SIGNS LIST

C1000: OTA center (managing server)
D1000: user device
E1000: software updating device
E1400: update control unit (software update control unit)
E1520: software unit storage (software storage)
E1620: application disabling unit (application disabling section)
EX000: ECU (vehicular control device)
UX000: software unit (software)
UX400: label information (label group)

The invention claimed is:

1. A software updating device that controls a software update of a vehicular control device, the software updating device comprising:

software storage that stores a plurality of software units including label information; and a software update control unit that controls a software update of the vehicular control device, wherein the label information includes at least safety-related information for the software units, and upon receiving a rollback command, the software update control unit selects, as a software unit to be rolled back from among the plurality of software units, a software unit having the safety-related label information identical to the safety-related label information of the software unit installed in the vehicular control device.

2. The software updating device according to claim 1, further comprising an application disabling section that disables the software unit installed in the vehicular control device in a case where the software update control unit cannot select a software unit to be rolled back from the software storage.

3. The software updating device according to claim 1, wherein the software storage further stores updated versions of the plurality of software units stored, and the software update control unit uses any of the updated versions of the plurality of software units to roll back the software unit installed in the vehicular control device.

4. The software updating device according to claim 1, wherein the safety-related information includes reliability of vehicular control and security that prevents unauthorized access from an external.

5. The software updating device according to claim 1, further comprising a transceiver that can communicate with a managing server via a network, wherein the software storage stores the plurality of programs received from the managing server via the transceiver, and the software update control unit requests the managing server to transmit an additional software unit in a case where the software update control unit cannot select a software unit to be rolled back from the software storage.

6. The software updating device according to claim 1, further comprising a transceiver that can communicate with a managing server and a user terminal via a network, the user terminal being able to communicate with the managing server via the network, wherein the managing server transmits the rollback command to the user terminal in a case where communication between the transceiver and the managing server is blocked.

* * * * *